US008782676B2

(12) United States Patent
Dokovski et al.

(10) Patent No.: US 8,782,676 B2
(45) Date of Patent: Jul. 15, 2014

(54) SYSTEM AND METHOD FOR COMMUNICATION BETWEEN PORTAL APPLICATIONS AND PORTLET CONTAINERS

(75) Inventors: Nikolai Dokovski, Sofia (BG); Diyan Yordanov, Varna (BG); Tanya Stoyanova, Sofia (BG)

(73) Assignee: SAP AG, Walldorf (DE)

( * ) Notice: Subject to any disclaimer, the term of this patent is extended or adjusted under 35 U.S.C. 154(b) by 744 days.

(21) Appl. No.: 12/571,325

(22) Filed: Sep. 30, 2009

(65) Prior Publication Data

US 2011/0078708 A1  Mar. 31, 2011

(51) Int. Cl.
*G06F 3/00* (2006.01)
(52) U.S. Cl.
USPC ......................................................... 719/329
(58) Field of Classification Search
None
See application file for complete search history.

(56) References Cited

U.S. PATENT DOCUMENTS

| | | | |
|---|---|---|---|
| 2006/0064422 A1* | 3/2006 | Arthurs et al. | 707/10 |
| 2007/0283281 A1* | 12/2007 | Ainsworth et al. | 715/760 |
| 2008/0077851 A1* | 3/2008 | Hesmer et al. | 715/234 |
| 2008/0162493 A1 | 7/2008 | Blohm et al. | |
| 2008/0163267 A1* | 7/2008 | Jurova et al. | 719/328 |
| 2008/0270924 A1 | 10/2008 | Yordanov et al. | |
| 2008/0270992 A1 | 10/2008 | Georgieva et al. | |

OTHER PUBLICATIONS

Linwood et al., "Building Portals with Java Portlet API", <http://media.techtarget.com/tss/static/articles/content/BuildingPortals/Sample+Booklet_Linwood-Minter.pdf>, 2004, 90 pages.*

"Portals and Portlets: The Basics" <http://editorial.mcpressonline.com/web/mcpdf.nsf/wdocs/5232/$FILE/5232_EXP.pdf>, Apr. 10, 2007, 19 pages.*
United States Patent Office's prosecution file for U.S. Appl. No. 12/571,094; 56 pages.
United States Patent Office's prosecution file for U.S. Appl. No. 12/570,203; 47 pages.
"Pluto—Welcome to Pluto," [online], <http://portals.apache.org/pluto/>, retrieved Sep. 28, 2009, 1 page.
"IBM Web Portal Software from WebSphere," [online],<http://www-01.ibm.com/software/websphere/portal/>, retrieved Sep. 28, 2009, 2 pages.
"Oracle WebLogic Portal Home Page," Oracle Technology Network, [online] <http://www.oracle.com/technology/products/weblogic/portal/index.html?_template=/ocom/print>, retrieved Sep. 28, 2009, 2 pages.

(Continued)

*Primary Examiner* — H S Sough
*Assistant Examiner* — Carina Yun
(74) *Attorney, Agent, or Firm* — Fish & Richardson P.C.

(57) ABSTRACT

This disclosure provides various embodiments for providing a communication layer between a portal application and a separate and independent portlet container. In one embodiment, a computer program product comprising computer readable instructions is operable when executed to expose an application programming interfaces (APIs) associated with methods permitting a portal application to invoke a portlet via the portlet container, where the portlet is run inside the portlet container. The computer program product exposes one or more service provider interfaces (SPIs) providing services implemented and used by the portlet container to obtain information about the portlet to be invoked. The computer program product further exposes an interface providing methods facilitating communications between the portal application and the portlet container during runtime of the portal application. The portal application running in combination with the portlet container implements the API, SPI, and interface during the portal application's runtime to allow for portal execution.

19 Claims, 9 Drawing Sheets

(56) References Cited

OTHER PUBLICATIONS

Java™ Portlet Specification, Version 2.0, Jan. 11, 2008, 274 pages.
Hepper, Stefan, and Köth, Oliver, "What's new in the Java Portlet Specification V2.0 (JSR 286)?", [online], <http://www.ibm.com/developerworks/websphere/library/techarticles/0803_hepper/0803_hepper.html?ca= . . . >, Mar. 18, 2008, retrieved Sep. 28, 2009, 17 pages.
JBoss Portal 2.7.1, "User Guide," Jan. 2009, 80 Pages.

* cited by examiner

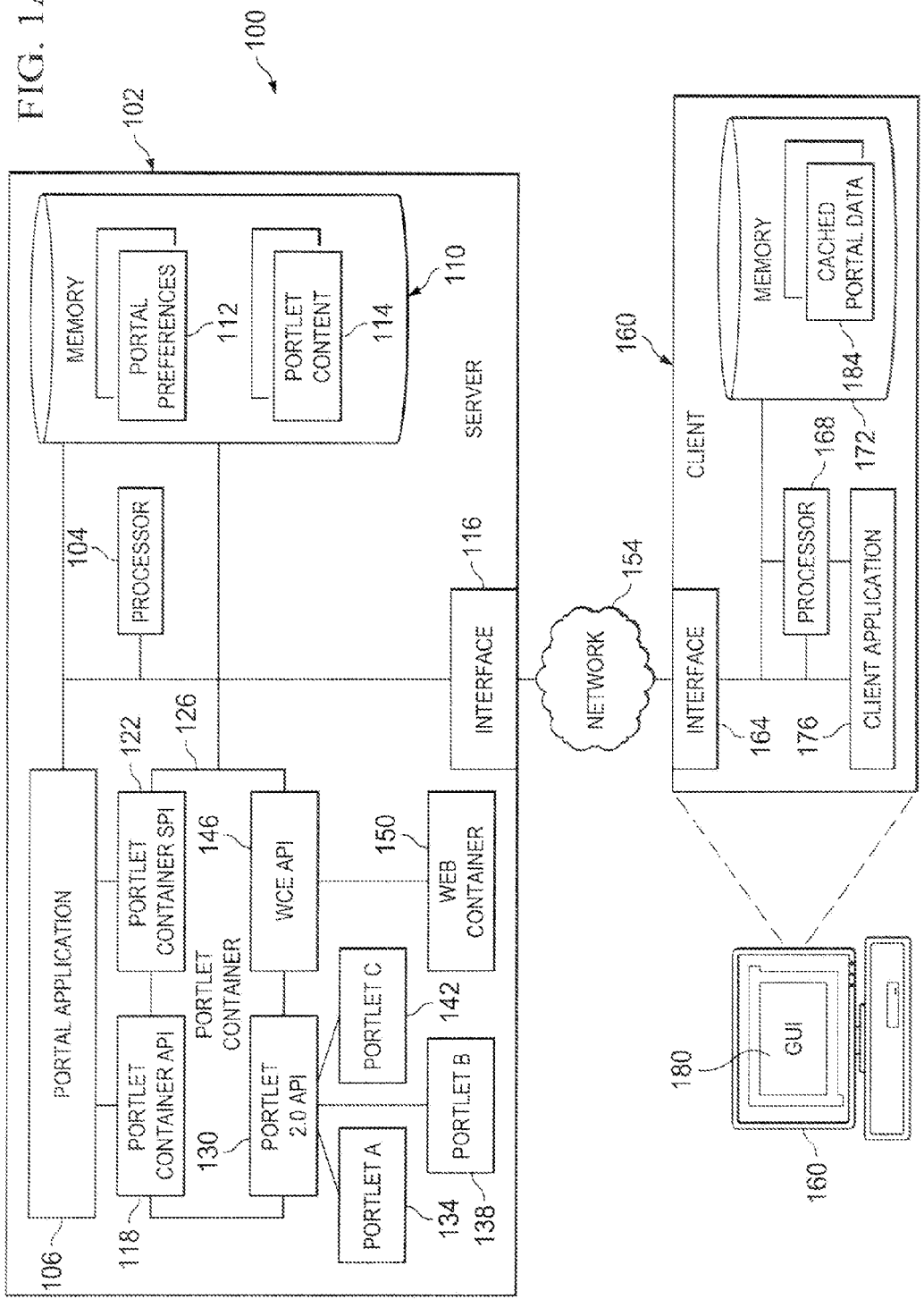

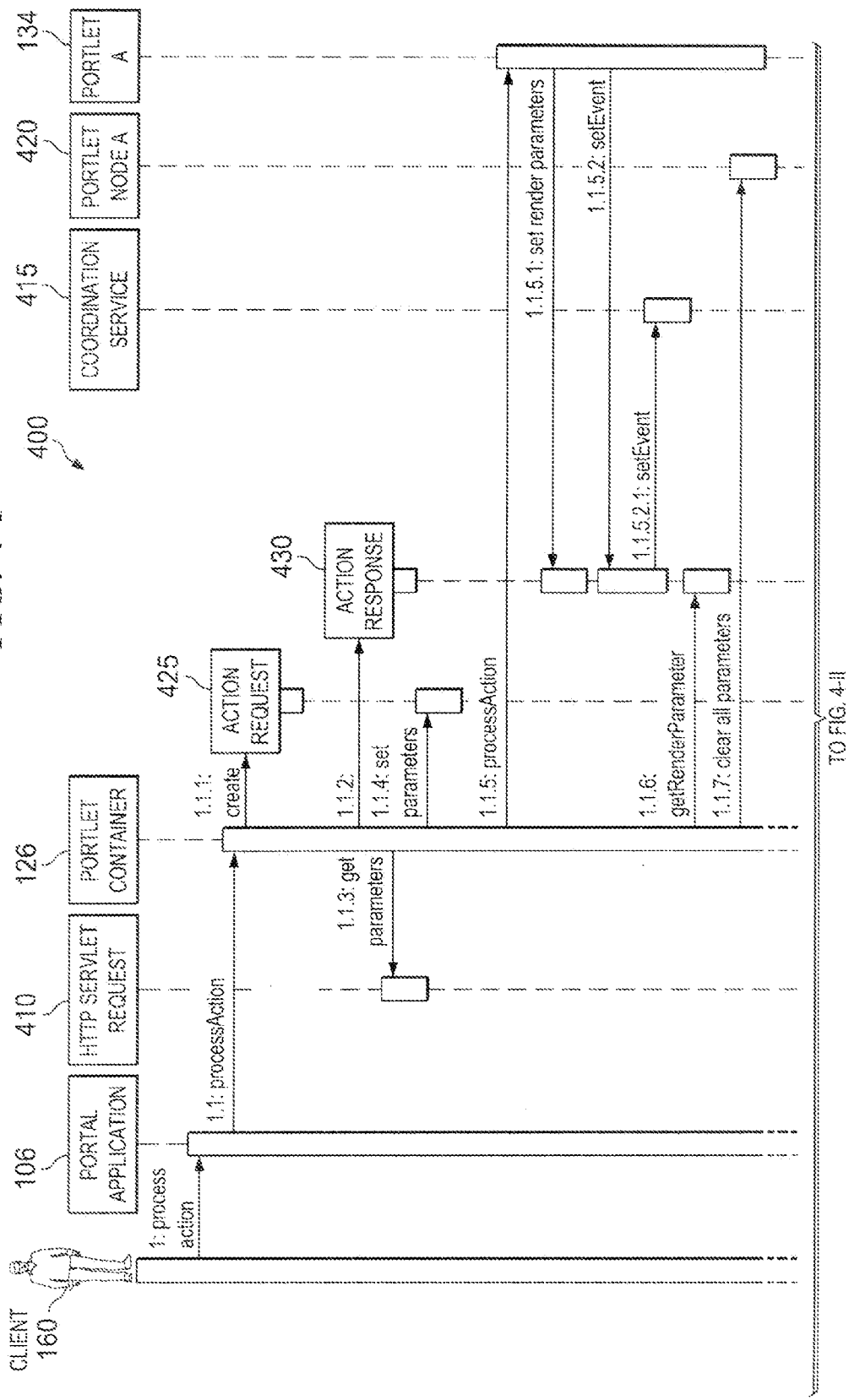
FIG. 4-I

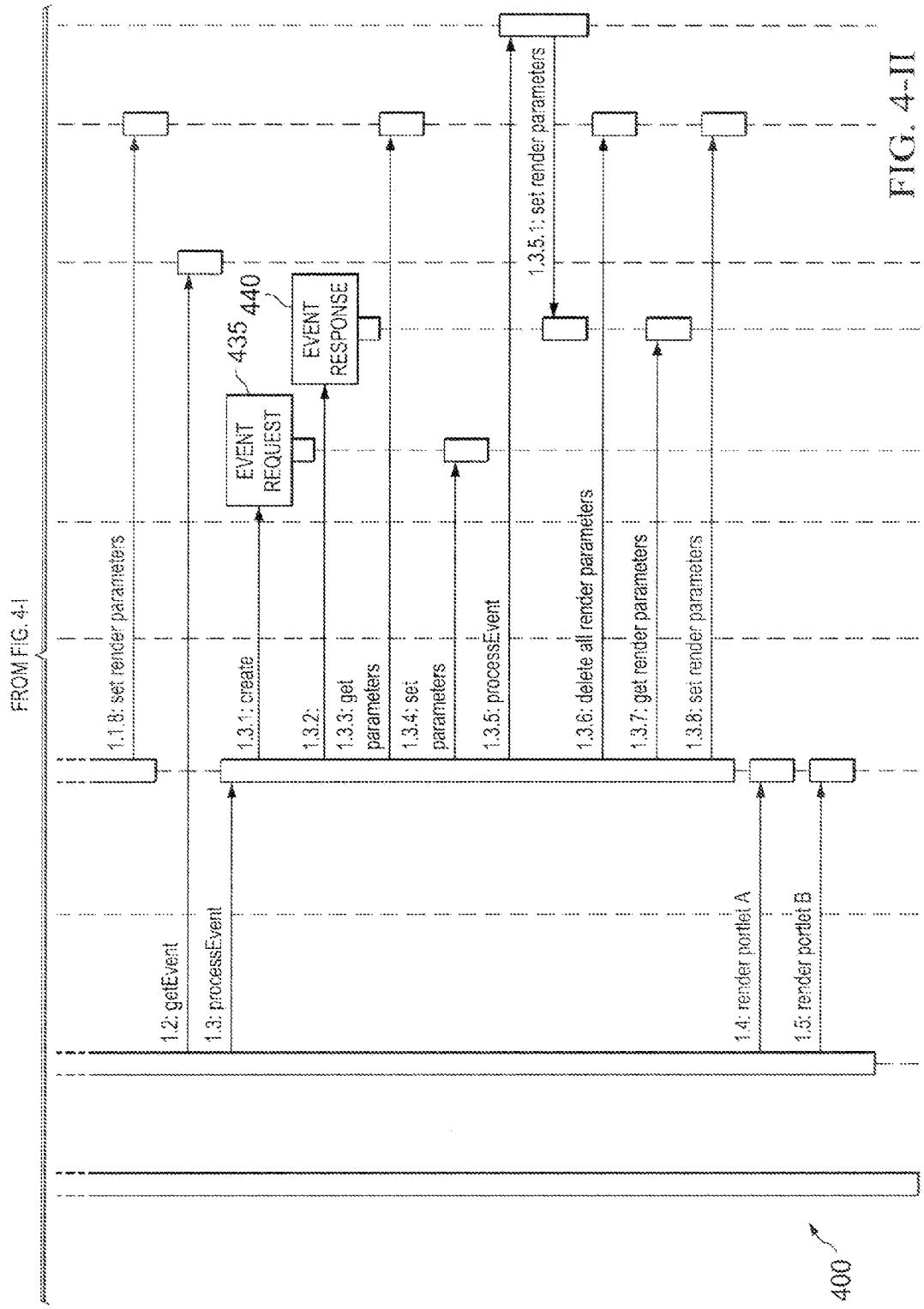

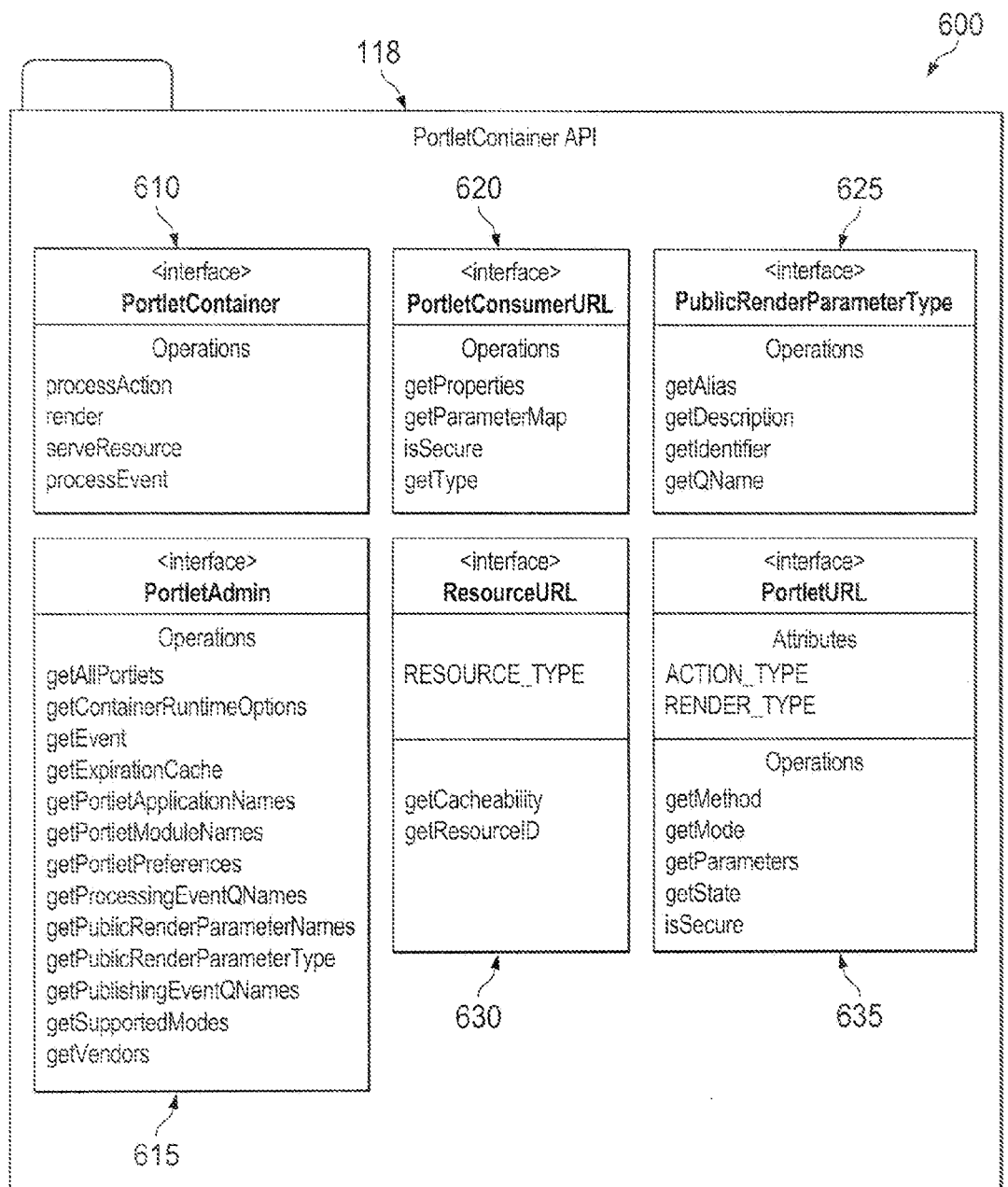
FIG. 6-I

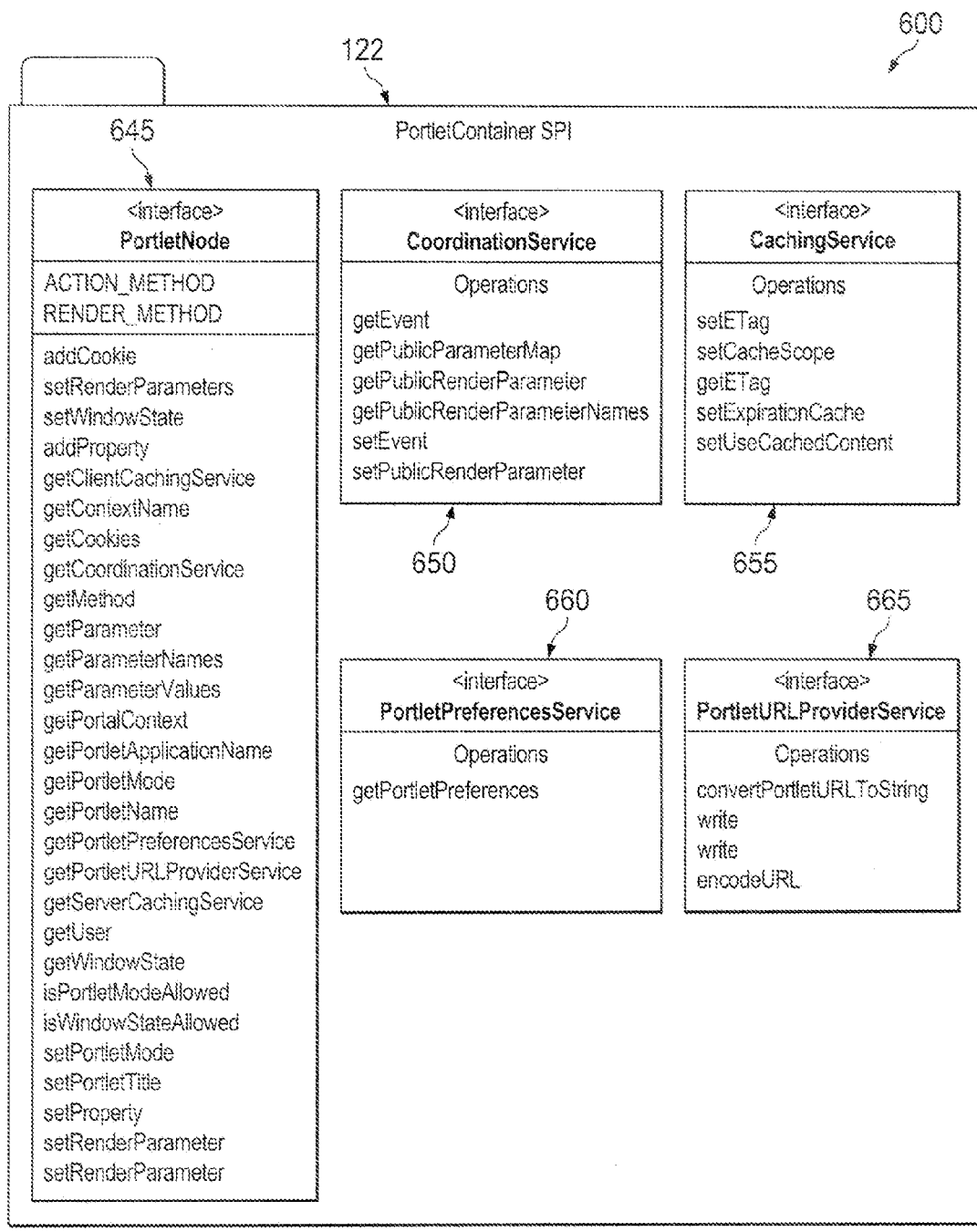
FIG. 6-II

SYSTEM AND METHOD FOR COMMUNICATION BETWEEN PORTAL APPLICATIONS AND PORTLET CONTAINERS

TECHNICAL FIELD

This present disclosure relates to software, and, more particularly, to a system and method for communication and the exchange of runtime information between a portal application and a portlet container.

BACKGROUND

Many organizations implement an enterprise portal to host internal and external applications. A portal is an application which aggregates applications together in a presentable format. Beyond merely being a presentation layer, a portal (or portal application) typically allows users to customize the presentation, including what applications to display. A portal can also provide a convenient single sign-on mechanism for users.

In general, portlets, one of the building blocks of portals, started to become popular with developers and programmers after the first version of the Java Portlet Specification (JSR 168) was released in 2003. Many vendors in the Java portal space, both commercial and open-source vendors, have implemented this standard, and developers have written portlets using the Java Portlet Application Programming Interface (API). JSR 168, however, stopped at defining the overall user interface (UI) component model, and did not define means for building integrated composite applications out of these components. Many limitations from JSR 168 were addressed with the release of Java Portlet Specification version 2.0 (JSR 286).

The main new features of JSR 286 are the capabilities for coordination between different portlets that can be implemented by different parties and packaged in different web application archive (WAR) files. Specifically, the coordination features of JSR 286 are based on a publish/subscribe model that does not request different portlet developers to know about each other's work. At development time, only data an individual portlet understands is defined, and the actual connections between portlets are created at deployment or at runtime. Leveraging these features, portal administrators or business users can build composite applications out of portlet components without predefined programming—for example, the portals described above.

Previous methods of communication between the portal application and the Portlet Container included embedding the Portlet Container within the portal application, such that the portal application and the Portlet Container are the same component. In these instances, communication between the portal application and the Portlet Container can be handled internally by the combined component, and no additional communication definitions or operations need to be defined. However, this solution applies several restrictions to a solution—namely, to change the portal application, a new portlet container must be defined in order to correspond to the modified portal application. Thus, modifications to either component cause significant hardship to developers and make ongoing integration of the components, or later modification to either of the components, difficult.

SUMMARY

This disclosure provides various embodiments for providing a communication layer between a portal application and a separate and independent portlet container. In one embodiment, a computer program product comprising computer readable instructions is operable when executed to expose an application programming interfaces (APIs) associated with methods permitting a portal application to invoke a portlet via the portlet container, where the portlet is run inside the portlet container. Further, the computer program product exposes one or more service provider interfaces (SPIs) providing services implemented and used by the portlet container to obtain information via the calling portal application about the portlet to be invoked. The computer program product further exposes an interface providing methods facilitating communications between the portal application and the portlet container during runtime of the portal application. The portal application running in combination with the portlet container implements the API, SPI, and interface during the portal application's runtime to allow the portal application to execute the portlet.

The details of one or more embodiments of the present disclosure are set forth in the accompanying drawings and the description below. Other features, objects, and advantages of the present disclosure will be apparent from the description and drawings, and from the claims.

DESCRIPTION OF DRAWINGS

FIG. 1A illustrates an example system implementing an advanced implementation of Portlet Container 2.0, providing additional portlet container application programming interfaces (APIs) and service provider interfaces (SPIs) as the communication layer between the portal application and the portlet container in accordance with one embodiment of the present disclosure.

FIGS. 4-I-4-II illustrate an example sequence diagram of an embodiment for creating a portal page with the additional functionality provided by the additional portlet container APIs and SPIs illustrated in FIG. 1A.

FIGS. 6-I-6-II illustrate an example block diagram of an embodiment illustrating the APIs and SPIs associated with the advanced runtime implementation of Portlet Container 2.0 illustrated in FIG. 5.

DETAILED DESCRIPTION

Figure 1B:
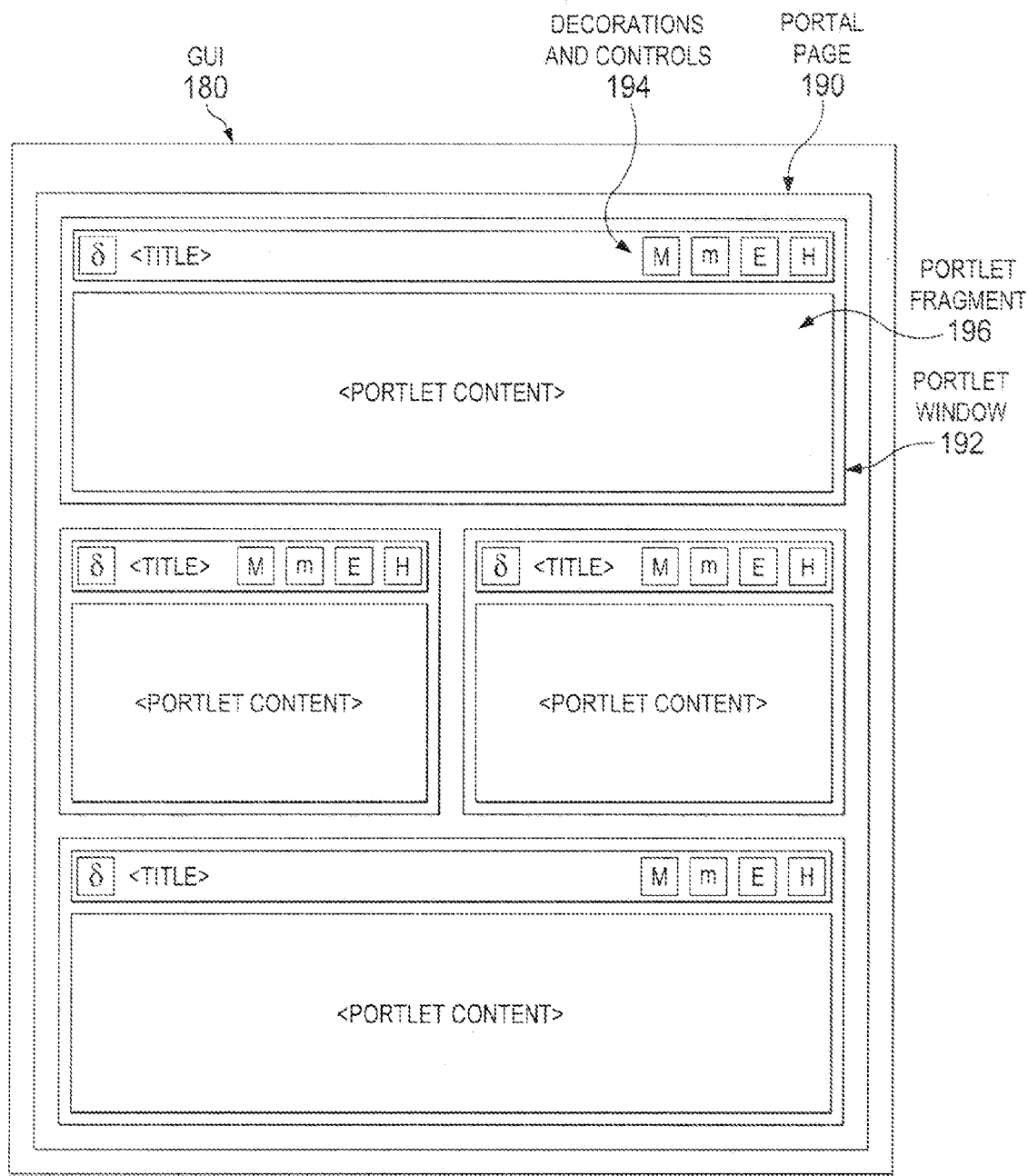
FIG. 1B is an example block diagram of one embodiment of a portal page.

With the release of the Java Portlet Specification version 2.0 (JSR 286), programmers and developers have increasingly been able to more closely integrate proprietary technologies and platforms previously used with the standardized component model for building componentized user interfaces (UIs) for services as defined by JSR 286. To do so, a common programming model for integrating proprietary and non-proprietary content into a single portal has been developed. Specifically, by providing an implementation of an advanced Portlet Container that can host and run portlets defined by the standard, simple integration of non-proprietary content into a formerly proprietary-only portal or portal application can be performed. Additionally, a Portlet Container compliant with the new JSR 286 standard provides the ability for proprietary portal applications and their portlets to use different UI technologies.

While the JSR 286 standard provides how web components and portlets can be invoked, the specification does not provide how the portal application communicates with the portlet itself. Clients associated with the portal application use specific Uniform Resource Locaters (URLs) to request a specific web page, the web page associated with or representing an overall portal application. As the portal application aggregates a plurality of portlets, the portal application searches the associated portlets and notifies the Portlet Container that specific portlets should be invoked. The portlets themselves reside within the Portlet Container, which provides the portlets with the appropriate runtime environment to perform their operations. JSR 286 specifies how these portlets are to be invoked, but does not provide the necessary information on how portal applications actually communicate with the Portlet Container. Thus, the present disclosure describes a particular embodiment of a Portlet Container that provides interfaces, methods, and other services that define the communication layer between the portal application and the Portlet Container.

The present disclosure describes a separation of the portal application and Portlet Container, in turn providing flexibility to users and developers, in that the Portlet Container is used for portlet deployment, portlet runtime, and other portlet-related tasks, separate from the portal application. Should changes to the portal application be necessary, there is no need to modify the Portlet Container. Further, customers and other developers can elect to use any portal application that is compatible with JSR 286, including open-source portal applications, as well as proprietary portal applications specific to a type of enterprise or other software. Additionally, the separation of the Portlet Container allows the design of a Portlet Container that is similar to previously-defined servlet containers. At a high level, the servlet container is another type of container that provides a runtime environment for web applications called servlets. By using the servlet container as a starting point, the Portlet Container described herein can leverage the functionality provided by the servlet container.

The goals of the advanced Portlet Container described in the present disclosure are to provide an implementation of the Portlet Container that is compliant with JSR 286, to provide an application programming interface (API) to be used by a proprietary or non-proprietary enterprise portal to invoke portlets and to perform various administrative tasks associated with the invoked portlets, and to provide an SPI to be implemented by the proprietary enterprise portal and used by the Portlet Container implementation to obtain information about the portlet to be invoked, events and public render parameters to be distributed to the invoked portlets, to conveniently store preferences associated with a particular portlet, to manage a portlet's caching mechanism, and means to generate a particular portlet URL.

The functional requirements of the advanced Portlet Container may include one or more of the following:

Provide a Portlet Container that runs portlets and provides them with the required runtime environment. This Portlet Container is to provide means to host the portlets and manage their lifecycle.

The Portlet Container is to receive requests from associated portal applications, and execute the requests on the portlets hosted by the container.

The provided Portlet Container is to be compliant with the JSR 286. During administrative phases when the portlet developer composes the portal page associated with the portal application, the developer is to be able to retrieve and interact with all necessary information for the portlets hosted in the Portlet Container.

Portlet invocation and administration functionality is to be available through an API defined by and provided with the Portlet Container. The API is to be accessible at any time when the service itself is started.

The Portlet Container API is to allow the portal application to invoke different phases of portlet lifecycle, including processAction, processEvent, serveResource, and render of a portlet.

Further, the Portlet Container API can provide a way for the portal application to retrieve a particular portlet's configuration information provided in the portlet's associated deployment descriptor. A portlet's deployment descriptor is generally an XML file associated with the portlet that defines a set of default values and settings for the particular portlet.

In order for the portal application to consume portlets contained by the Portlet Container, the portal application can supply information to the Portlet Container about the portlet to be invoked and information about the portal environment in which the portlet will be run. The portal application will provide this information to the Portlet Container by implementing a corresponding Portlet Container SPI.

The defined Portlet Container SPI is to allow the Portlet Container to retrieve information about the portlet to be invoked, such as the portlet's unique ID, a set of portlet preferences, Coordination Service information, URL Provider Service information, Caching Service information, the current portlet mode, and the current window state.

The Portlet Container SPI is to provide an interface that provides access to the Portlet Container to the Coordination Service responsible for distributing portlet events and public render parameters.

The Portlet Container SPI can provide an interface for the URL Provider Service to be used by the Portlet Container to generate portal specific portlet URLs.

The Portlet Container SPI is also to define and provide an interface for the Caching Service used by the Portlet Container to communicate a portlet's caching management details.

The portal application can be notified when a new portlet application is deployed or when an existing portlet application is redeployed. The portal application can also to be notified when a portlet application is stopped or ends.

Portlets defined in both JSR 168 and JSR 286 can be supported by the Portlet Container. In other words, the Portlet Container can be backwards compatible with portlets defined under JSR 168 specification.

Turning to the example implementation of FIG. 1A, the illustrated environment 100 which illustrates a particular implementation of the advanced Portlet Container, or Portlet Container 2.0, and includes or is communicably coupled with server 102 and one or more clients 160, at least some of which communicate across network 154. In general, environment 100 depicts an example configuration of a system implementing an advanced implementation of Portlet Container 2.0, which provides additional Portlet Container APIs and SPIs to implement the communication layer between the portal application and the Portlet Container, and in turn, each of the individual portlets.

In general, the server 102 is any server that stores one or more portal applications 106, where at least a portion of the portal applications 106 aggregate portlet applications, or portlets, together in a presentable format in response to requests sent or received from users or clients within and communicably coupled to the illustrated environment 100. In some instances, the server 102 may store a plurality of portal applications 106 and portlets, while in other instances, the server 102 may be a dedicated server meant to store and execute only a single portal application 106. In some instances, the server 102 may comprise a web server, where the portal applications 106 represent one or more web-based applications accessed and executed via network 154 by the clients 160 of the system to perform the programmed tasks or operations of the portal application 106.

At a high level, the server 102 comprises an electronic computing device operable to receive, transmit, process, store, or manage data and information associated with the environment 100. Specifically, the server 102 illustrated in FIG. 1A is responsible for receiving requests from one or more client applications 176 associated with the clients 160 of environment 100 and responding to the received requests by processing said requests in the associated portal application 106 (and communicably coupled portlets and/or portlet applications), and sending or displaying the appropriate response from the portal application 106 (and aggregated portlets and/or portlet applications) back to the requesting client application 176. In addition to requests from the external clients 160 illustrated in FIG. 1A, requests associated with the portal application 106 may also be sent from internal users, external or third-party customers, other automated applications, as well as any other appropriate entities, individuals, systems, or computers. As used in the present disclosure, the term "computer" is intended to encompass any suitable processing device. For example, although FIG. 1A illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1A, the server 102 includes a processor 104, an interface 116, a memory 110, and one or more portal applications 106. The interface 116 is used by the server 102 for communicating with other systems in a client-server or other distributed environment (including within environment 100) connected to the network 154 (e.g., client 160, as well as other systems communicably coupled to the network 154). Generally, the interface 116 comprises logic encoded in software and/or hardware in a suitable combination and operable to communicate with the network 154. More specifically, the interface 116 may comprise software supporting one or more communication protocols associated with communications such that the network 154 or interface's hardware is operable to communicate physical signals within and outside of the illustrated environment 100.

Generally, the network 154 facilitates wireless or wireline communications between the components of the environment 100 (i.e., between the server 102 and the clients 160), as well as with any other local or remote computer, such as additional clients, servers, or other devices communicably coupled to network 154 but not illustrated in FIG. 1A. The network 154 is illustrated as a single network in FIG. 1A, but may be a continuous or discontinuous network without departing from the scope of this disclosure, so long as at least a portion of the network 154 may facilitate communications between senders and recipients. The network 154 may be all or a portion of an enterprise or secured network, while in another instance at least a portion of the network 154 may represent a connection to the Internet. In some instances, a portion of the network 154 may be a virtual private network (VPN), such as, for example, the connection between the client 160 and the server 102. Further, all or a portion of the network 154 can comprise either a wireline or wireless link. Example wireless links may include 802.11a/b/g/n, 802.20, WiMax, and/or any other appropriate wireless link. In other words, the network 154 encompasses any internal or external network, networks, subnetwork, or combination thereof operable to facilitate communications between various computing components inside and outside the illustrated environment 100. The network 154 may communicate, for example, Internet Protocol (IP) packets, Frame Relay frames, Asynchronous Transfer Mode (ATM) cells, voice, video, data, and other suitable information between network addresses. The network 154 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1A, server 102 includes a processor 104. Although illustrated as a single processor 104 in FIG. 1A, two or more processors may be used according to particular needs, desires, or particular embodiments of environment 100. Each processor 104 may be a central processing unit (CPU), a blade, an application specific integrated circuit (ASIC), a field-programmable gate array (FPGA), or another suitable component. Generally, the processor 104 executes instructions and manipulates data to perform the operations of server 102 and, specifically, the one or more plurality of portal applications 106. Specifically, the server's processor 104 executes the functionality required to receive and respond to requests from the clients 160 and their respective client applications 176, as well as the functionality required to perform the other operations of the portal application 106, such as retrieving and rendering data associated with the one or more portlet applications associated with and aggregated by the portal application 106. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1A are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 104 executes one or more portal applications 106 on the server 102.

At a high level, each of the one or more portal applications 106 is any application, program, module, process, or other software that may execute, change, delete, generate, or otherwise manage information according to the present disclosure, particularly in response to and in connection with one or more requests received from the illustrated clients 160 and their associated client applications 176. In certain cases, only one portal application 106 may be located at a particular server 102. In others, a plurality of related and/or unrelated portal applications 106 may be stored at a single server 102, or located across a plurality of other servers 102, as well. In certain cases, environment 100 may implement a composite portal application 106. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the portal applications 106 may represent web-based applications accessed and executed by remote clients 160 or client applications 176 via the network 154 (e.g., through the Internet). Further, while illustrated as internal to server 102, one or more processes associated with a particular portal application 106 (such as some or all of the associated portlet and/or portlet applications) may be stored, referenced, or executed remotely. For example, one portion of a particular portal application 106 may be a web service associated with the application that is remotely called, while another portion of the portal application 106 may be an interface object or agent bundled for processing at a remote client 160. Moreover, any or all of the portal applications 106 may be a child or sub-module of another software module or enterprise application (not illustrated) without departing from the scope of this disclosure. Still further, portions of the portal application 106 may be executed by a user working directly at server 102, as well as remotely at client 160.

At least one of the portal applications 106 represents a web application that can aggregate portlets and/or portlet applications together in a presentable format. Beyond merely being a presentation layer, the portal application 106 typically allows users to customize their presentation, including what portlets and/or portlet applications to display. Additionally, certain portal applications 106 can be used to provide a convenient single sign-on mechanism for users, providing access to each portlet and/or portlet application associated with the portal application 106 once the user is logged in, such that the user does not have to log into every application separately. Each portal application 106 may be associated with a specific URL, such that users and clients 160 requesting the specific URL are directed to the portal application 106. When the portal application 106 receives the request, it can access the one or more portlets and/or portlet applications via the Portlet Container 126 associated with the portal application 106 to generate a response aggregating the processing and data associated with the various portlet applications.

Server 102 contains, and processor 104 executes, several portlets associated with the portal application 106 and stored within the Portlet Container 126. In the illustrated embodiment of FIG. 1A, server 102 stores three portlets: Portlet A 134, Portlet B 138, and Portlet C 142. Although each of the illustrated portlets is located internal to server 102, the portlets may in some instances be stored within, or hosted by, the Portlet Container 126. Additionally, one or more of the portlets may be located external to server 102, as well as external to illustrated environment 100, and still be included within the set of portlets aggregated within the portal application 106. As illustrated in FIG. 1A, the portal application 106 aggregates information generated by or received from each of Portlet A 134, Portlet B 138, and Portlet C 142 to form a complete web or portal page. Additionally, any or all of the illustrated portlets may be a portlet application or a portion thereof. A portlet application is a collection of portlets, classes, HTML pages, servlets, JavaServer Pages (JSPs), and other resources necessary for a portlet to build the associated UI component. Restated, portal pages may be associated with one or more portlet applications in order to provide certain functionality or other content to the portal application 106. Additionally, one portlet can be a part of different portal pages. Still further, one portal page can embed portlets from different portlet applications.

The Portlet Container 126 interacts with each of the portlets (134, 138, 142) via the Portlet 2.0 API 130, a defined API included with the JSR 286 specification defining the interfaces, methods, and classes for interacting with the portlets. Portlet Container 126 uses the Portlet 2.0 API 130 to communicate and interact with each of the portlets associated therewith. Broadly, the Portlet API 130 defines the contract between the Portlet Container runtime environment and the portlets contained therein. The interfaces, methods, and classes of the Portlet 2.0 API 130 are used to communicate with the portlets so that requests from the portal application 106 (and thus, the client 160) are processed by each individual portlet, and any information and markup generated in response to the portal application's 106 request are returned via the Portlet Container 126.

In general, a portlet is an individual web component made accessible to users or clients via the portal application 106. Typically, a single portlet generates only a fragment of the markup and information that a client or user views in a visualization of a related portal application, such as portal application 106. Portlets are reusable software (and in some cases, web) modules that provide access to web-based content, applications, and other resources. Because portlets are reusable, multiple instances of a single portlet can be used in connection with a portal application 106 to provide different data to each client or user. From a client's perspective, a portlet can be a window on a portal page providing a specific service or set of information. Generally, each portlet on the portal page is responsible for providing its output in the form of markup fragments to be integrated into the portal page. The portal application 106 is responsible for providing the markup surrounding each individual portlet. In Hypertext Markup Language (HTML), for example, the portal application 106 can provide markup that gives each portlet a title bar with minimize, maximize, help, and edit icons.

Portlet Container 126 provides the runtime environment for portlets using the JSR 168 and 286 portlet specification. In general, the portlet container 126 contains the portlets illustrated in FIG. 1A, and manages their lifecycle. The Portlet Container 126 receives requests from the portal application 106 to execute requests on the one or more portlets hosted by the Portlet Container 126. While the Portlet Container 126 manages the lifecycles of the various portlets, the Portlet Container 126 is not responsible for aggregating the content produced by the individual portlets. Instead, it is the portal application's 106 responsibility to handle the aggregation of data and content received from the individual portlets. The Portlet Container 126 forwards requests from the portal application 106 to the appropriate portlet, and receives and forwards the related responses from the portlets to the portal application 106 for aggregation. The Portlet Container 126 can be implemented as an extension of the servlet container and can expose the PortletContainerInterface interface for integration with the portal application 106. In some instances the Portlet Container 126 will reuse the integration of Portlet Container 1.0 as an extension of the servlet container and implement the needed interfaces from a known location to be able to reuse the class loading, deploy, and web application lifecycle management of a web container.

For a portlet hosted in a non-distributed environment, the Portlet Container 126 will instantiate and use only one portlet object per portlet definition. The loading and instantiation of portlets occurs when the Portlet Container 126 starts the associated portlet and/or portlet application. In most cases, the Portlet Container 126 uses the same ClassLoader that a web container would use for the web application portion of the portlet application. After the portlet object is instantiated, the Portlet Container 126 tries to initialize the portlet. If an error occurs during the initialization process, the Portlet Container 126 does not place the portlet in service. Instead, the Portlet Container 126 tries to reinitialize the portlet later when the portlet is needed to service a future request.

As illustrated in FIG. 1A, the Portlet Container 126 includes a PortletContainer API 118 and a PortletContainer SPI 122. In general, the PortletContainer API 118 defines the functionality the Portlet Container 126 provides to the portal application 106. Through the PortletContainer API 118, the portal application 106 can invoke portlets and can receive information about the portlets deployed on the server 102, as well as provide a means for the portal application 106 to perform administrative tasks on the deployed portlet applications and portlets. The PortletContainer SPI 122 defines a collection of interfaces that the portal application 106 (or other Portlet Container 126 consumers such as a different portal application) can implement. Through the PortletContainer SPI 122, the Portlet Container 126 receives information about the invoked portlet and other portal-related information. The information is received through several services:

Portlet Preferences service—responsible for persisting of portlet preferences;
Portlet URL Provider service—responsible for creating Portlet-specific URLs;
Coordination service (Event Manager and Public Render Parameter Provider)—handles eventing and public render parameters;
ServerCaching service—responsible for managing cached contents for portlets; and
ClientCaching service—responsible for managing the cache content of portlet resources (i.e., ETag and browser caching).

In some instances, the ServerCaching and ClientCaching services may be combined into a single CachingService service. Further discussion of the specific interfaces, methods, and operations performed by the PortletContainer API 118 and the PortletContainer SPI 122 will be discussed with regard to FIGS. 5 and 6 below.

FIG. 1A also shows that the Portlet Container 126 includes a web container extension (WCE) API 146 that allows the Portlet Container 126 to communicate with one or more web containers 150. The WCE API 146 is an API provided by a servlet container that is running concurrently on server 102 that provides to a set of engine services a mechanism to plug into an existing web container (deploy time and lifecycle) with their specific functionality. The Portlet Container 126 can use the WCE API 146 to manage a set of web containers 150 associated with a particular web application(s), allowing the Portlet Container 126 to provide this additional functionality to server 102 and portal application 106. Generally, the WCE API 146 is provided by the associated servlet container to facilitate easy building of new containers on top of the servlet container.

The server 102 also includes memory 110. Memory 110 may include any memory or database module and may take the form of volatile or non-volatile memory including, without limitation, magnetic media, optical media, random access memory (RAM), read-only memory (ROM), removable media, or any other suitable local or remote memory component. Memory 110 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more portal applications 106. Additionally, memory 110 may include any other appropriate data, such as VPN applications, firmware logs and policies, firewall policies, a security or access log, print or other reporting files, as well as others.

Specifically, illustrated memory 110 includes a set of portal preferences 112 and a set of cached portlet content 114. Although illustrated within memory 110, some or all of the illustrated elements may be located or stored outside of memory 110 and/or server 102 (e.g., in different memories and/or on multiple different servers, as well as in other locations external to, but communicably coupled with, environment 100). For example, the set of portal preferences 112 and/or the cached set of portlet content 114 may be included within the portal application 106 such that both (or one of) sets are inherent to the portal application 106 itself. Additionally, some or all of the set of portal preferences 112 may be stored at and specific to a particular client 160, and stored in the respective client's memory. In those instances, the portal application 106 may access such information stored at the client 160 prior to or concurrently with receiving the client request. In some instances, the preferences themselves may be included within the client request, allowing the portal application 106 to set itself to the proper configuration prior to providing the client 160 with the initial request. In general, the set of portal preferences 112 may include client-specific information associated with the visualization and operations of a particular portal application 106, and may be different for, or specific to, each client 160 interacting with the portal application 106. The set of cached portlet content 114 may include content generated from various portlets associated with the portal application 106, both internal and external to server 102. In some instances, information stored in the set of cached portlet content 114 may be associated with a particular ETag provided by the client 160. The ETag token may be generated by a portlet and returned to the portal application 106. When the client 160 interacts with the portal application 106, the portal application 106 determines the target portlets and sends a request to the Portlet Container 126. The Portlet Container 126 may then turn to the corresponding portlet passing the received ETag token to the portlet. The portlet associated with the received ETag can validate whether the cached content is still valid and instruct the portal application 126 to used the cached content or to generate new content. In other words, when the ETag is received with a client request, the portal application 106 may determine whether the information associated with the received ETag and stored in memory 110 is current. If such information is still valid, the portal application 106 may elect to use the cached content. If the information is not valid, the portal application 106 can request, via the Portlet Container 126, the associated portlet to generate updated content. The cached content may also be tied to a particular timeout value, such that when the timeout value is exceeded the cached content is deleted and/or destroyed. When an ETag associated with the deleted content is received from the client 160, the portal application 106 will send a new request to the relevant portlet for updated content.

The illustrated environment of FIG. 1A also includes one or more clients 160. Each client 160 may be any computing device operable to connect to or communicate with at least the server 102 and/or via the network 154 using a wireline or wireless connection. Further, as illustrated, each client 160 includes a processor 168, an interface 164, a graphical user interface (GUI) 180, a client application 176, and a memory 172. In general, each client 160 comprises an electronic computer device operable to receive, transmit, process, and store any appropriate data associated with the environment 100 of FIG. 1A. It will be understood that there may be any number of clients 160 associated with, or external to, environment 100. For example, while illustrated environment 100 includes a single client 160, alternative implementations of environment 100 may include multiple clients 160 communicably coupled to the server 102, or any other number suitable to the purposes of the environment 100. Additionally, there may also be one or more additional clients 160 external to the illustrated portion of environment 100 that are capable of interacting with the environment 100 via the network 154. Further, the term "client" and "user" may be used interchangeably as appropriate without departing from the scope of this disclosure. Moreover, while each client 160 is described in terms of being used by a single user, this disclosure contemplates that many users may use one computer, or that one user may use multiple computers. As used in this disclosure, client 160 is intended to encompass a personal computer, touch screen terminal, workstation, network computer, kiosk, wireless data port, smart phone, personal data assistant (PDA), one or more processors within these or other devices, or any other suitable processing device. For example, each client 160 may comprise a computer that includes an input device, such as a keypad, touch screen, mouse, or other device that can accept user information, and an output device that conveys information associated with the operation of the server 102 (and portal application 106) or the client 160 itself, including digital data, visual information, the client application 176, or the GUI 180. Both the input and output device may include fixed or removable storage media such as a magnetic storage media, CD-ROM, or other suitable media to both receive input from and provide output to users of the clients 160 through the display, namely, the GUI 180. In some instances, client 160 may be specifically associated with an administrator of the illustrated environment 100. The administrator can modify various settings associated with one or more of the other clients 160, the server 102, the portal application 106, and/or any relevant portion of environment 100. For example, the administrator may be able to modify the relevant timeout values associated with the set of cached portlet content 114, as well as any of the set of portal preferences 112.

Each client 160 includes a client application 176 associated with the portal application 106. In particular, the client application 176 is any software, such as a web browser or remote portion of the portal application 106, that allows the client 160 to access and work with the portal application 106. Particularly, the client application 176 is a software application that enables the client 160 (or a user thereof) to display and interact with one or more of the portal pages provided by the portal application 106 executed at the server 102. Where the portal applications 106 are web-based applications, the client application 176 may be a specific application dedicated to use with a particular portal application 106, a general web browser with functionality allowing it to interact with the portal application 106, or any other appropriate software.

Further, the illustrated client 160 includes a GUI 180 comprising a graphical user interface operable to interface with at least a portion of environment 100 for any suitable purpose, including generating a visual representation of the client application 176 (in some instances, the client's web browser) and the interactions with the portal application 106, including the responses received from the portal application 106 received in response to the requests sent by the client application 176. Generally, through the GUI 180, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 180 can represent any graphical user interface, including but not limited to, a web browser, touch screen, or command line interface (CLI) that processes information in environment 100 and efficiently presents the information results to the user. In general, the GUI 180 may include a plurality of user interface (UI) elements, some or all associated with the client application 176, such as interactive fields, pull-down lists, and buttons operable by the user at client 160. These and other UI elements may be related to or represent the functions of the client application 176, as well as other software applications executing at the client 160. In particular, the GUI 180 may be used to present the client-based visualization or perspective of the portal application 106, and may be used (as a web browser or using the client application 176 as a web browser) to view and navigate the portal application 106, as well as various web pages located both internal and external to the server, some of which may be associated with the portal application 106. In some instances, the GUI 180 may be a part of or the entirety of the client application 176, while in others merely a tool for displaying the visual representation of the client and portal applications' 106 actions and interactions. In some instances, the GUI 180 and the client application 176 may be used interchangeably, particularly when the client application 176 represents a web browser associated with the portal application 106.

Similar to server 102, the illustrated client 160 includes both an interface 164 and processor 168. The interface 164 of each client 160 may be similar to the interface 116 of the server 102, in that it may comprise logic encoded in software and/or hardware in a suitable combination and operable to communicate with the network 154. More specifically, interface 164 may comprise software supporting one or more communication protocols such that the network 154 or hardware is operable to communicate physical signals to and from the client 160. The client's processor 168 may also be similar in nature to that of the server's processor 104. Again, although only illustrated as a single processor 168, two or more processors may be used according to particular needs, desires, or embodiments of environment 100. Similar to the server's processor 104, each client processor 168 may be a central processing unit (CPU), a blade, an application specific integrated circuit (ASIC), a field-programmable gate array (FPGA), or another suitable component. Generally, the processor 168 executes instructions and manipulates data to perform the operations of the client 160 and, specifically, the associated client application 176 described above. Specifically, the client's processor 168 executes the functionality required to send requests from the client 160 and its client application 176, as well as receive and process the associated responses from the portal application 106.

Each client 160 also includes a memory 172. Memory 172 may be similar to the server's memory 110, and may include any memory or database module, taking the form of either volatile or non-volatile memory including, without limitation, magnetic media, optical media, random access memory (RAM), read-only memory (ROM), removable media, or any other suitable local or remote memory component. For example, memory 172 may store backup data, parameters, cookies, variables, algorithms, instructions, rules, or references thereto, as well as any other suitable data.

As illustrated in FIG. 1A, memory 172 includes a set of cached portal data 184 associated with the client application 176 and portal application 106. The set of cached portal data 184 is used by the client application 176 to cache, or store, portlet and/or portal data associated with the responses received from the portal application 106 during client-portal application interactions. In some instances, the set of cached portal data 184 may store only the most recent information associated with the portal application 106, while in other instances, the set of cached portal data 184 may store additional information about previous content, thereby allowing the client application 176 to provide certain cached data to the user, if requested. Additionally, the cached portal data 184 may store certain ETags associated with certain portlets of the portal application 106, such that when a request for information from the portal application 106 is sent, information from the set of stored ETags is included. This may signal to the portal application 106 a certain user's identity or previous state, and allow the portal application 106 to load the cached information associated with a particular ETag from the set of cached portlet content 114. In general, the ETags may behave and be used similarly to cookies in a browser setting, allowing certain information associated with a particular user to be stored at the client 160 and accessed quickly by the server 102 when a request is sent. For example, when the client application 176 generates a request to be sent to the portal application 106, the client application 176 can access the set of cached portal data 184 to retrieve and integrate the current set of cached information into the request prior to transmission to the portal application 106.

While FIG. 1A is described as containing or being associated with a plurality of elements, not all elements illustrated within environment 100 of FIG. 1A may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes, in addition to those purposes described herein.

FIG. 1B is a block diagram of a particular embodiment of a portal page 190 generated by the portal application 106. Portal page 190 is generated by the portal application 106 and displayed within GUI 180 of client 160. As illustrated, portal page 190 is built up of one or more portlet windows 192. The portlet windows 192 includes two parts: decorations and controls parts 194 and portlet fragment parts 196. Decorations and controls parts 192 decide how the title bar, controls, and borders of each portlet window appear. The portlet fragment 196 is contributed to the portlet application 106. The server 102, on which a portal application 106 is running, decides the overall look and feel of the portal page, such as the log, the colors of the title bars, the images for the controls, and other items of the page's look and feel. By changing a few standard files, the complete look and feel of the portal application 106 (and portal page 190) can be changed. In general, the portal page 190 shows the results of a user or client request sent to the portal application 106, after the portal application 106 has received the fragment and markup information from each associated portlet aggregated in the particular portal page 190.

Figure 2:
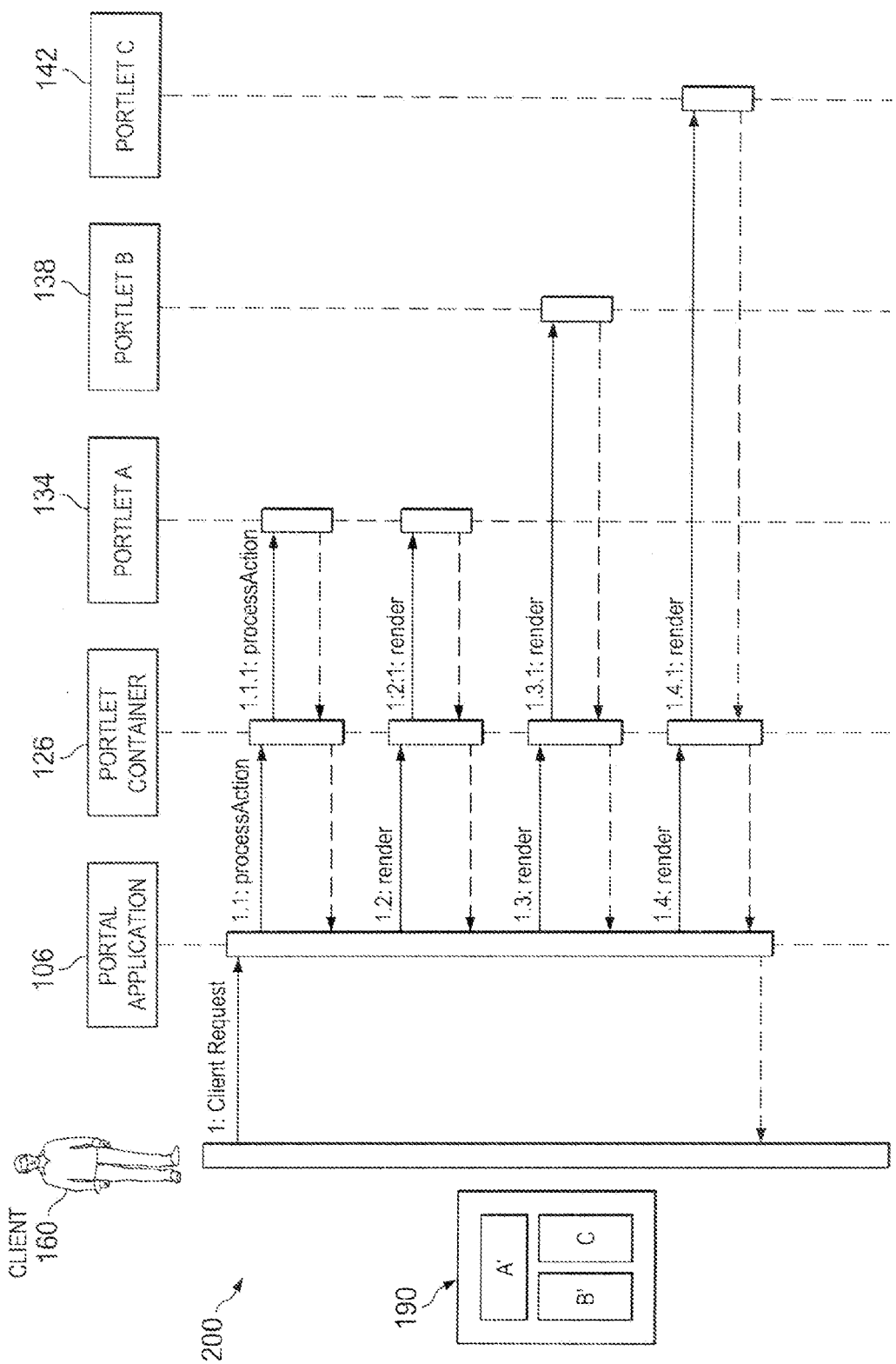
FIG. 2 is an example sequence diagram of an embodiment for creating a portal page.

FIG. 2 is a sequence diagram 200 illustrating one embodiment of generating, or creating, a portal page. Specifically, FIG. 2 shows how content from separate portlets (Portlet A 134, Portlet B 138, and Portlet C 142) may be assembled by a portlet container 126 to create portal page 190. As illustrated, client (or user) 160 sends a request to the portal application 106 that requires information or content from each of the illustrated portlets. In other words, the request requires content from each of the portlets to be rendered. The request, as described, can be sent via network 154 from the client 160 by some interaction with the user and the client application 176.

The client request is received by portal application 106. In response, portal application 106 determines the set of portlets that should be executed in order to fulfill the client's request. By using the application programming interfaces (APIs) of a corresponding Portlet Container 126, portal application 106 invokes the various portlets. Portlet Container 126 maintains all available portlets and runs independently, but in response to requests, from portal application 106. Portlet Container 126 invokes the appropriate portlets—as illustrated here, Portlet A 134, Portlet B 138, and Portlet C 142. The Portlet Container 126 receives the content generated by each of the portlets, and provides the corresponding fragments to the portal application 106. Portal application 106 aggregates these fragments according to the page's defined structure, and creates the associated portal page 190. Once created, portal application 106 sends the created portal page 190 to the client via network 154, where it is then presented to the client or associate via the client's GUI 180.

As described, client requests reach a portlet via the portal application 106. The portal application 106 invokes the portlet through the PortalContainer API 118. The API 118 allows the portal application 106 to request each of the methods defined in the Portlet interface—processAction and render. In addition, if the portlet implements any of the optional lifecycle interfaces EventPortlet and ResourcePortlet, the additional lifecycle methods processEvent and serveResource may be invoked. When the portal application 106 invokes any of these lifecycle methods, it can provide the HttpServletRequest and HttpServletResponse objects. These objects convey the information from the original client request/response associated with the client request to the Portal Application. In addition, it can provide the PortletNode object that represents the portal context in which the portlet runs. Then, the Portlet Container 126 creates the respective PortletRequest and PortletResponse objects to be used in invocation of the lifecycle methods.

Commonly, client requests are triggered by URLs created by portlets. A portlet URL is targeted to a particular portlet. For example, client requests triggered by an action URL include one action request, zero or more event requests, many render requests (one per portlet in the portal page), and zero or more resource requests. Client request triggered by a render URL include many render requests (one per portlet in the portal page) and zero or more event requests (no sequence is specified). Client requests triggered by a resource URL include one serve resource request.

When Action Request is triggered, the portal application 106 invokes the processAction method of the PortletContainer interface. The Portlet Container 126 then creates the corresponding ActionRequest and ActionResponse objects out of the HttpServletRequest and HttpServletResponse objects. These objects are passed to the processAction method of the portlet referred by the PortletNode.

When the portal application 106 determines that the client request triggers an EventRequest, the portal application 106 invokes the processEvent method of the PortletContainer interface. The Portlet Container 126 then creates the corresponding EventRequest and EventResponse objects out of the HttpServletRequest and HttpServletResponse objects. These objects are passed to the processEvent method of the portlet referred by the PortletNode interface.

With the EventRequest object, the Portlet Container 126 provides access to the event payload, window state, portlet mode, current render parameters, portal context, portlet session, and portlet preferences data. This data is available through the PortletNode object passed to the processEvent method. Further, the event payload can be obtained from the CoordinationService provided with the PortletNode object. The current public render parameters are obtained from the EventRequest object and from the CoordinationService. The target portlet may also set new render parameters in the EventResponse object. If public render parameters are set then this is reflected in the CoordinationService. The portlet may also publish events via the EventResponse.setEvent method. To publish the state changes and the notifications to the other portlets, the Portlet Container 126 can set the events in the CoordinationService via the setEvent method.

For invoking the render phase of portlets, the portal application 106 calls the render method of the PortletContainer interface. The Portlet Container 126 then creates the corresponding RenderRequest and RenderResponse objects out of the HttpServletRequest and HttpServletResponse objects. These objects are passed to the render method of the portlet referred by the PortletNode. The implementation of the RenderRequest object provides access to the following information: the parameters of the render request (including public render parameters that are made available via the CoordinationService), window state, portlet mode, portal context, portlet session, and portlet preferences data. Again, this data is available via the PortletNode object.

Resource request is a new request type introduced with JSR 286. Via this request, the portlet can serve resources or render content fragments. In order for the portal application 106 to invoke such methods on the target portlet, a method called serveResource is supplied to the PortletContainer interface. Again, the Portlet Container 126 creates the corresponding ResourceRequest and ResourceResponse objects out of the HttpServletRequest and HttpServletResponse objects. These objects are passed to the serveResource method of the portlet referred by the PortletNode. With the ResourceRequest object, the Portlet Container 126 provides the following information: parameters of the resource request, the input stream, the window state, the portlet mode, the portal context, the portlet session, and the portlet preferences data. The data is retrieved from the PortletNode, except for the input stream and portlet session, which are based on the underlying HttpServletRequest. For generating the content the Portlet Container 126 provides an output stream in the ResourceResponse object.

Usually, portlet developers extend the GenericPortlet abstract class when they want to get default functionality and convenient handling of action, event, resource and render requests. This approach is also robust against future changes in Portlet specification. For such cases the GenericPortlet class handles dispatching requests to the target methods that have the corresponding annotations. This class implements the Portlet, EventPortlet, and ResourceServingPortlet. However, portlet developers can use his/her own implementation of these interfaces and use annotations to define the implementation methods. Portlet Container 126 can, in some instances, support this case and process the following annotations:

@ProcessAction(name=<action name>)
@ProcessEvent(name=<event name>)
@RenderMode (name=<portlet mode name>)

This is done in the following way for action dispatching, event dispatching, resource serving dispatching, and rendering dispatching.

Action Dispatching

When processAction method on PortletContainer interface is invoked, the Portlet Container 126 searches for a method annotated with @ProcessAction(name=<action name>), where the <action name> is equal to the request parameter ActionRequest.ACTION_NAME, and the following signature is defined in the targeted portlet:

```
void <methodname> (ActionRequest,
    ActionResponse) throws PortletException,
    java.io.IOException.
```

Event Dispatching

When processEvent method on PortletContainer interface is invoked, the Portlet Container 126 searches in the targeted portlet for the method annotated with @ProcessEvent (name=<event name>, where the <event name> specifies the event to be processed, and the method signature is:

```
void <methodname> (EventRequest,
    EventResponse) throws PortletException,
    java.io.IOException.
```

The Portlet Container 126 distinguishes both types of event name format—"{"+Namespace URI+"}"+local part. If only the local part is provided, then the Portlet Container 126 will search for the alternative annotation "@ProcessEvent (name=<event name_local_part>." If no such methods are found, the Portlet Container 126 sets the received render parameters as new render parameters, similar to the GenericPortlet.

Resource Serving Dispatching

When serveResource method of PortletContainer interface is invoked by the portal application 106, the Portlet Container 126 invokes the serveResource method of the targeted servlet. If the target servlet does not implement the ResourceServingPortlet, the Portlet Container does nothing.

Rendering Dispatching

When the render method of the PortletContainer interface is invoked by the portal application 106, the Portlet Container 126 searches in the target portlet for the method annotated with tag @RenderMode (name=<portlet mode name>) and the following signature:

```
void <methodname> (RenderRequest,
    RenderResponse) throws PortletException,
    java.io.IOException.
```

If no such methods are found, the Portlet Container 126 will throw PortletException. Also, the render method of PortletContainer evaluates the RenderRequest. RENDER_PART request attribute. This attribute can have two values: RenderRequest.RENDER_HEADERS and RenderRequest.RENDER_MARKUP, indicating the two parts of the render request. If the RENDER_HEADERS part is set, the portlet should set only header related data and the title. In this case, the Portlet Container 126 will only look for a render method in the target portlet. In those instances, the portlet should set headers, invoke setTitle and set nextPossiblePortletModes). If the request contains the RENDER_MARKUP attribute, then the Portlet Container 126 will search for the annotated render methods.

FIGS. 4-I-4-II illustrate an example sequence diagram 400 of an embodiment for creating a portal page with the additional functionality provided by the additional capabilities of the JSR 286 specification, and the various requests described above. Specifically, FIGS. 4-I-4-II show how content from a particular portlet (Portlet A 134) may be assembled by the Portlet Container 126 to create portal page 190. As illustrated, client (or user) 160 sends a request to the portal application 106. As illustrated, the request is performed after the client 160 clicks on a link or button associated with a particular URL. Additional parameters associated with the action request are encoded within the URL. Action parameters are not render or public render parameters. The next set of parameters are request parameters associated with the client request. After publishing request parameters, post data is no longer available from the stream. Generally, previously set render parameters are automatically cleared when new action and/or request parameters are sent. Action and request parameters are not propagated to subsequent render calls. Additionally, render parameters can be set in the ActionResponse object 430 during the processAction interaction.

As illustrated, the client 160 initially activates, clicks on, or requests an actionURL. Certain action parameters are encoded in the activated URL. The client's action is associated with a client request send to portal application 106. The portal application 106 processes the actionURL request by invoking the processAction method to the Portlet Container 126. The Portlet Container 126, as described above, generates an ActionRequest object 425 and an ActionResponse object 430 based on one or more action parameters typically included within the processAction request and provided via an HttpServletRequest object 410 created by the portal application 106. The Portlet Container 126 then gets a set of additional parameters from the HttpServletRequest object 410 for use in invoking the action request, and sets the retrieved parameters in the ActionRequest object 426 itself. Once the ActionRequest object 426 is prepared, the Portlet Container 126 invokes the portlet associated with the client request (Portlet A 134) using the appropriate processAction method and the ActionRequest object 425.

Upon receiving the processAction request, Portlet A 134 sets one or more render parameters associated with Portlet A 134 in the ActionResponse object 430. As illustrated in FIG. 4-I, when Portlet A 134 wants to send an event to another portlet, it sets the event in the received PortletResponse object via the setEvent method. The setEvent method is sent to the ActionResponse object 430, which in turn is passed to the CoordinationService 415. The CoordinationService 415 is part of the communication layer between the portal application and the Portlet Conatiner 126 that coordinates and broadcasts events among various portlets. In other words, the CoordinationService 415 allows for coordination between multiple portlets, assisting in the provision of interactive portlets on a single portal page.

Next, the Portlet Container 126 uses the getRenderParameter( ) method to retrieve the one or more render parameters from the ActionResponse object 430. After completing the execution of the processAction method of the portlet, the Portlet Container 126 removes all previously set private render parameters from the PortletNode A 420 and sets the parameters from the action response. Parameters set in PortletNode A 420 are used in subsequent event and render calls.

Parameters set during the processAction method are used as render parameters during processEvent calls. Previously set render parameters are generally not propagated. Render parameters for subsequent calls can be set during the processEvent method in the EventResponse object 440. As shown, the portal application 106 sends a getEvent method request to the CoordinationService 415 associated with the processAction method. Additionally, the portal application 106 sends a processEvent method request to the Portlet Container 126. In response, the Portlet Container 126 creates both an EventRequest object 435 and an EventResponse object 440. Once the objects are created, the Portlet Container 126 retrieves the set of parameters set during the processAction method call from PortletNode A 420, and sets those retrieved parameters in the EventRequest object 435. The Portlet Container 126 then sends a processEvent request to Portlet A 134, and in response, Portlet A 134 sets one or more render parameters in the EventResponse object 440.

After execution of the processEvent method, the Portlet Container 126 removes or deletes the render parameters set in the PortletNode A 420 during the processEvent method. Portlet Container 126 then retrieves the parameters set in the EventResponse object 440, and sets those parameters in PortletNode A 420 to be used in subsequent event or render calls. As illustrated, portal application 106 then renders Portlet A 134 via the Portlet Container 126 as a result of the actions described above. In some instances, such as those shown here, additional portlets are also rendered via the Portlet Container 126 based on concurrent or additional execution of the portal application 106 and the Portlet Container 126. Although described as above in FIGS. 4-I-4-II, various implementations may be similar to or different from that illustrated. For example, certain portions or actions of FIGS. 4-I-4-II may be performed in a different order or not performed at all, while additional actions, requests, or other events may be included that are not currently illustrated. For example, the sequence diagram 400 may also include one or more serveResource method calls, allowing the portlet to serve additional resources to the portal application 106. Other variations will be understood by one of skill in the art.

Figure 3:
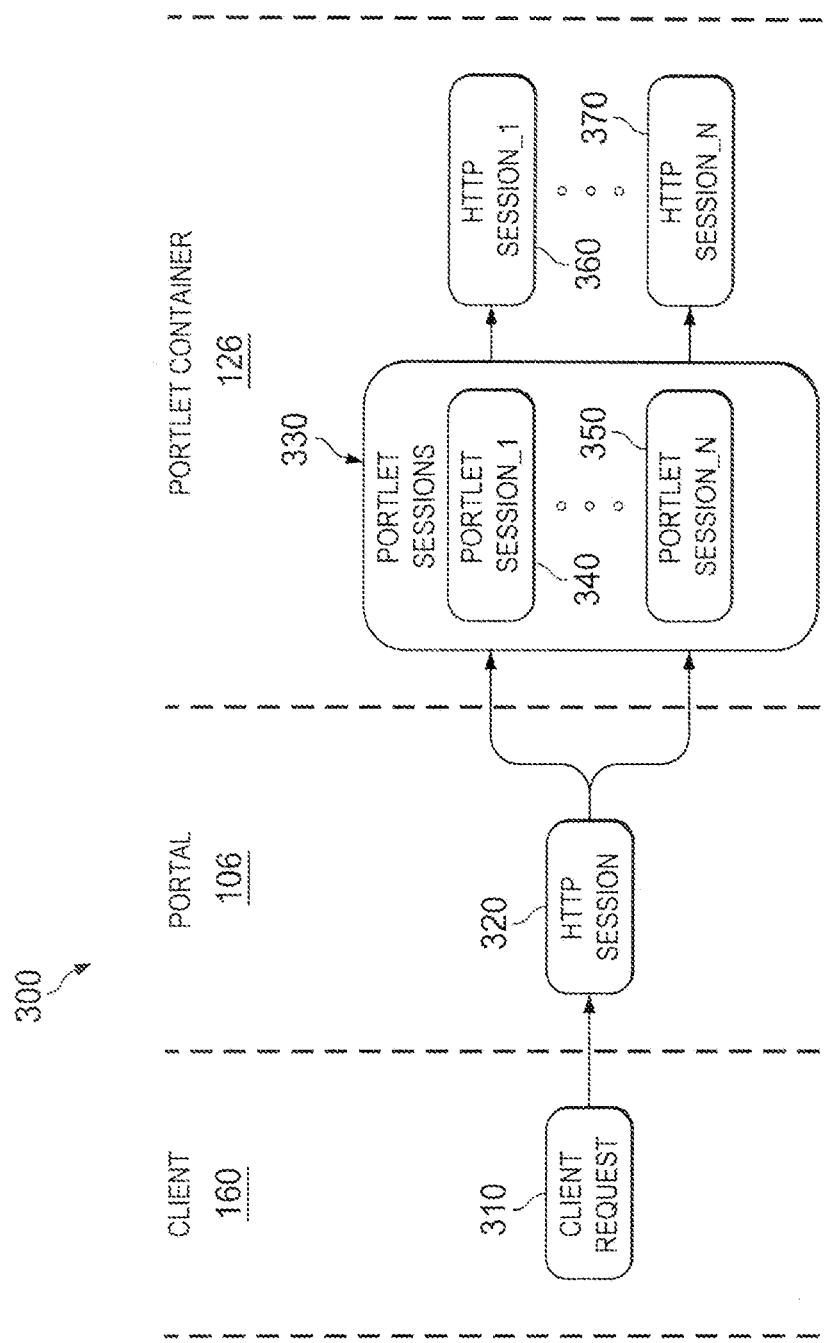
FIG. 3 is an example block diagram of an embodiment for handling portlet sessions by the portal application and portlet container.

FIG. 3 is a block diagram 300 of an example embodiment of how portlet sessions are handled. In computer science, a "session" is either a lasting connection using the session layer of a network protocol or a lasting connection between a user and a peer, typically a server. When a request is sent from a client/user to a server via a network protocol, a session is established. The network protocol may be Hypertext Transfer Protocol (HTTP) and the session an HTTP session. The HTTP session can store session-specific data. When a portlet is invoked, a portlet session is established that stores data for the portlet. The session associates the client with the request to the portlet, thus allowing reuse of the portlet by a plurality of clients by creating a plurality of portlet sessions defined by the requesting client.

In the embodiment illustrated in FIG. 3, client 160 sends a client request 310 to a portal application 106 that requires portal page 190 to be generated. An HTTP session 320 is established between the client 160 and the portal application 106. The portal application 106 has to obtain portlets from a plurality of portlet applications and aggregate their content in order to generate portal page 190. Therefore, the client request 310 is forwarded to Portlet Container 126, which manages the portlet applications, or individual portlets (such as Portlet A 134, Portlet B 138, and Portlet C 142 of FIG. 1A). Portlet sessions 330 are created for every portlet that needs to be invoked. Each portlet session, from portlet session_1 340 to portlet session_N 350, refers to an HTTP session specific to the portlet application and the current portlet session. For example, portlet session_1 340 refers to HTTP session_1 360, and so on, to portlet session_N 350, which refers to HTTP session_N 370.

These HTTP sessions differ from the initial HTTP session established between the client 160 and the portal application 106. Thus, the different portlets do not share the same HTTP session. However, portlets, servlets, and JSPs within a particular portlet application share the same HTTP session. For portlets that reside within one and the same portlet application, each portlet request is generated as a result of a group of requests originating from the portal application 106 to complete a single client request 310, each portlet acquiring the same portlet session. The portlet session stores all attributes in the HTTP session of the portlet application. User attributes set in the portlet session are visible in the HTTP session associated with the portlet and vice versa. When a portlet invalidates a portlet session, the HTTP session also gets invalidated, and vice versa. In addition, crating a new portlet session results in creation of a new HTTP session on which the portlet session is based.

Figure 5:
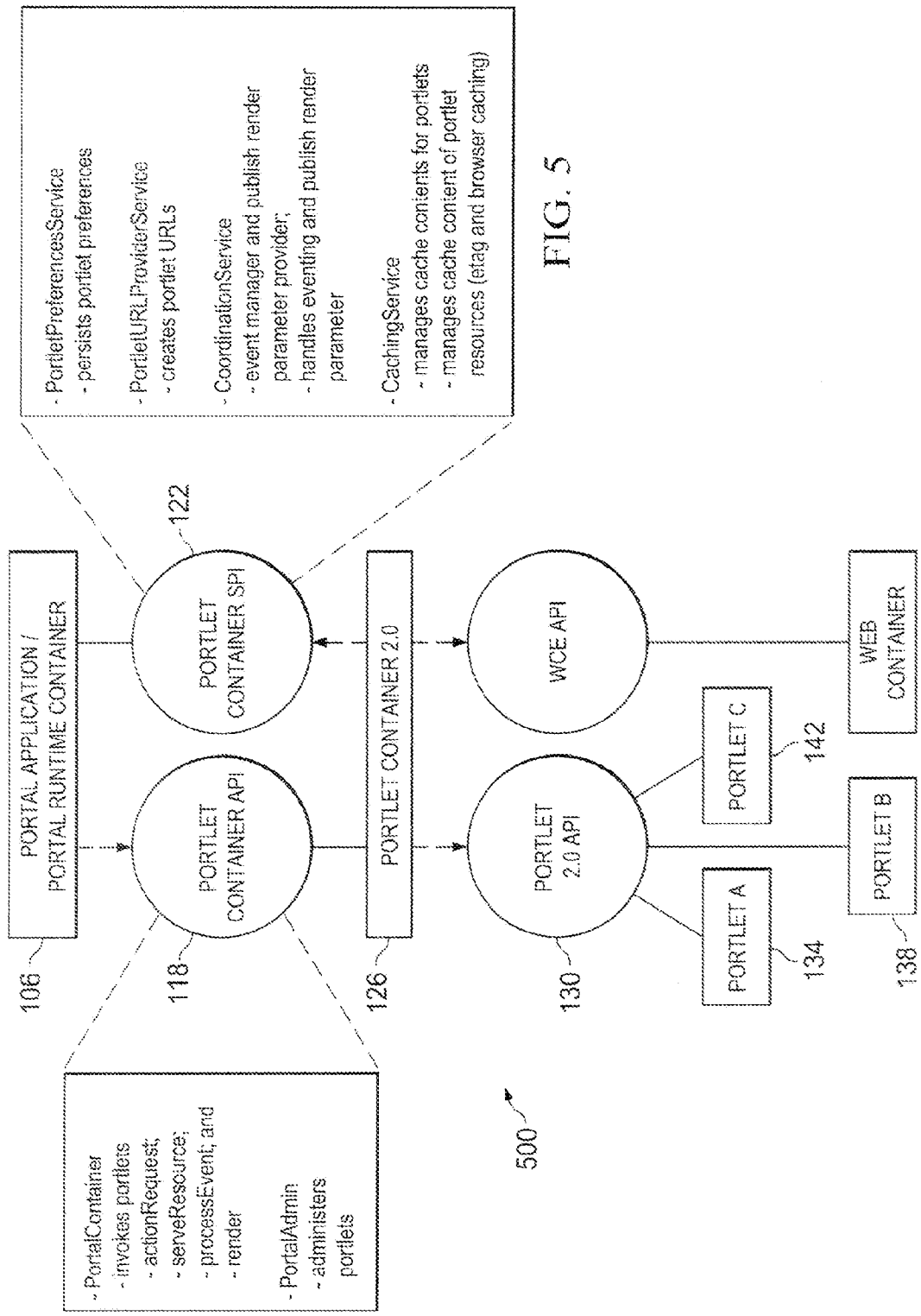
FIG. 5 illustrates an example runtime embodiment of the advanced implementation of Portlet Container 2.0 illustrated in FIG. 1A.

FIG. 5 illustrates an example runtime system 500 of the advanced implementation of Portlet Container 2.0 illustrated in FIG. 1A. As illustrated, the portal application 106 is represented by the portal runtime container 106, the portal runtime container 106 aggregating and consuming portlets via the runtime instantiation of the Portlet Container 126.

At runtime, the Portlet Container 126 registers, and thus exposes, a PortletContainerinterface runtime interface (not illustrated), in the runtime system 500. The portal application 106 looks up the PortletContainerinterface in the runtime registry, and uses the interface to implement and gain access to the APIs and SPIs defined by the PortletContainer API 118 and PortletContainer SPI 122. Specifically, the Portlet Container 126 implements the PortletContainerinterface interface to be used by the portal application 106 for access to the Portlet Container's 126 PortletAdmin and PortletContainer interfaces (615 and 610 of FIG. 6-I, respectively). The portal application 106 uses the PortletAdmin and PortletContainer interfaces to administrate portlets and to call the Portlet Container 126 to run or invoke particular portlets in response to client requests.

As client requests are received, the portal application 106 determines that the client requests are targeted to particular portlets on the portal application's 106 associated portal page 190. In response, the portal application 106 obtains the PortletContainer interface from the PortletContainerInterface interface, and subsequently invokes the requested portlets via the obtained PortletContainer interface. Because of the Portlet Container's 126 compliance with both JSR 168 and JSR 286, the invoked portlets may be written to either standard.

Using the PortletContainer interface, the portal application 106 can invoke one of four phases for any of the portlets: a processAction phase, a processEvent phase, a serveResource phase, or a render phase. For each phase, the portal application 106 supplies information about the portlet to be invoked through the PortletNode interface (645 of FIG. 6-II) of the PortletContainer SPI 122. The PortletNode object represents the portlet instance that the portal application wants to invoke. The PortletNode object also carries additional information about the portal context in which the portlet runs. The portal application 106 provides an already-wrapped request and response object that represent the requests the client has made to the portal application 106 and that, in turn, need to be handled by the invoked portlet.

During the administration phase of portlet interaction, such as when the portal administrator composes the portal page 190 or designs the visualizations of the portal application 106, the portal application 106 needs particular information about the portlets hosted in the Portlet Container 126. The portal application 106 obtains this information via the PortletAdmin interface exposed by the PortletContainerInterface interface. In various embodiments, some or all of the following information about the portlets hosted by the Portlet Container 126 is available:
  the names of vendors that have supplied applications that contain portlets;
  the names of applications that contain portlets;
  the names of the one or more web modules inside applications that contain portlets;
  the names of the portlets that belong to a web module;
  the portlet preferences defined for a particular portlet;
  the expiration cache timeout defined for a particular portlet;
  the supported portlet modes for a particular portlet;
  the public render parameters supported by a particular portlet;
  the type of the public render parameters supported by a particular portlet;
  the QNames of publishing events supported by a particular portlet;
  the QNames of the processing events supported by a particular portlet;
  the event definition of certain events in a particular portlet application; and
  container runtime options and their values as defined for a particular portlet.

When the portal application 106 invokes a portlet via the PortletContainer interface, the Portlet Container can retrieve the following information from the supplied PortletNode interface of the PortletContainer SPI 122:
  a unique ID associated with the portlet;
  the name of the application associated with the portlet;
  the name of the portlet;
  the current Windows State of the portlet;
  whether the current user is allowed to switch to a specific Windows State;
  the current Portlet Mode of the portlet;
  whether the current user is allowed to switch to a specific Portlet Mode;
  the portal context in which the portlet runs;
  whether the user making the request has read-access to the user's attributes;
  information regarding the PortletPreferencesService;
  information regarding the PortletURLProviderService;
  information regarding the CoordinationService;
  information regarding the CachingService;
  the type of portlet request targeted to the portlet;
  the render parameters set to the portlet; and
  the value of any cookies set by the portlet via the PortletResponse.addProperty (Cookie) method.

Additionally, when the portal application 106 invokes a portlet via the PortletContainer interface, the Portlet Container 126 can propagate back to the portal application 106 the following information via the PortletNode interface of the PortletContainer SPI 122:
  the new Windows State set by the portlet;
  the new Portlet Mode set by the portlet;

any parameters for the portlet valid for subsequent render requests;

any properties (set via the PortletResponse.addProperty (Cookie) method) to be used with the subsequent render requests;

any cookies to be used by the portlet application response (e.g., cookies set via PortletResponse.addProperty (Cookie) method); and the preferred portlet title to be used by the portal application 106 for the portlet's title bar.

Through its implemented connections to the Portlet Container 126, the portal application 106 receives notification, information, and events regarding the deployment, stoppage, and termination of certain portlets and portlet applications. Upon receiving these events and information, the portal application 106 can invalidate, clear, or update the cached content associated with any portlet and/or portlet application (and stored in the set of cached portlet content 114 of FIG. 1A), as well as update the set of portal preferences 112 associated with a particular portlet or portlet application.

The portal application 106 also implements the PortletNode interface in order to identify requested portlets and to provide information related to the portal runtime environment. Using these interfaces, the portal application 106 manages the order of invocation for processAction, processEvent, serveResource, and render requests of the portlets associated with the portal page. Further, because the portal application 106 manages how portlets in a portal page 190 are wired together or interrelated, the way events are to be distributed between the portlets is also managed by the portal application 106. Similarly, the portal application 106 manages how public render parameters received with a client request will be shared among the portlets in the single portal page.

The portal application 106 can supply the implementation of the CoordinationService within the PortletNode. Specifically, the CoordinationService provides information to the Portlet Container 126 about the public render parameters and the events to be processed. In response, the Portlet Container 126 propagates back to the portal application 106 the published public render parameters and events associated with the currently invoked portlet.

The persistent storage of portlet preferences is performed by the portal application 106. The Portlet Container 126 retrieves the persisted portlet parameters (stored with the set of portal preferences 112 in server 102) via the PortletPreferencesService within the PortletNode.

The portal application 106 also implements the PortletURLProviderService to provide means for providing string representations of portlet URLS to be embedded in the markup provided with the render portal page. The PortletURLProviderService is provided with the PortletNode. Additionally, the portal application 106 implements the CachingService in order to support the expiration and validation cache for portlet content. The Portlet Container 126 uses CachingService to propagate portlet runtime sets for the caching mechanism.

As new requests are received, the portal application 106 may be responsible for starting a new application thread for each portlet that will be invoked. The portal application 106 sends an already-wrapped request and response to the Portlet Container 126. This is done with the purpose of hiding portal application-specific details. The response is wrapped in order for the portal application 106 to be able to correctly aggregate the generated portlet content. Alternatively, the portal application 106 can reuse an application thread to perform the processAction method. For the rendering phase, more threads can be concurrently spawned in order to speed up portal page generation.

The portal application 106 implements the PortalContext (containing version, supported modes, and window states), and provides the information to the Portlet Container 126 at request time via the PortletNode. In some instances, the portal application 106 will store, or cache, portlet data and content next to user-specific portal data at server 102. This decision allows the portal application 106 and Portlet Container 126 to take the full benefit of the portal application platform persistence layer. Alternative methods of storing portlet data are also available.

FIGS. 6-I-6-II illustrate an example block diagram 600 of an embodiment illustrating the PortletContainer API 118 and PortletContainer SPI 122 associated with the advanced runtime implementation of Portlet Container 2.0 illustrated in FIG. 5, the API and SPI used to provide the communication layer between the portal application 106 and the Portlet Container 126 for the invocation and execution of portlets in the runtime system 500. It will be understood that certain methods, interfaces, and attributes may be associated with different APIs and/or SPIs than illustrated in FIGS. 6-I-6-II, as well as in other APIs or SPIs not shown herein. Furthermore, some functionality associated with one or more of the illustrated APIs or SPIs may be combined or split among various interfaces and/or APIs/SPIs.

As previously described, the Portlet Container 126 includes a PortletContainerInterface runtime interface (not illustrated) that the Portlet Container 126 registers, and that subsequently can be used by the portal application 106. The PortletContainerInterface runtime interface has two methods which provide access to the main interfaces provided by the Portlet Container 126. The PortletContainerInterface runtime interface includes at least a subset of the following methods: "public PortletAdmin getPortletAdmin( )" and "public PortletContainer getPortletContainer( )".

The "getPortletAdmin( )" method allows the portal application 106 to obtain the PortletAdmin interface 615 from the PortletContainer API 118, the PortletAdmin interface 615 is responsible for supplying the information that the portal application 106 needs during the administration phase of building the associated portal page 190. The "getPortletContainer( )" method allows the portal application 106 to obtain the PortletContainer interface 610 from the PortletContainer API 118, the PortletContainer interface 610 responsible for invocation of different phases of a portlet.

As previously described, the PortletContainer interface 610 allows the portal application 106 to invoke portlets. The Portlet Container 126 itself manages the life cycle of the portlets. The Portlet Container 126 implements the PortletContainer interface 610 in order to invoke portlets to process requests in one of four phases: processAction phase, processEvent phase, serveResource phase, and render phase. The PortletContainer interface 610 includes at least a subset of the following methods: "processAction( )" "render( )" "serveResource( )" and "processEvent( )".

For each of the methods included in the PortletContainer interface 610, the portal application 106 is responsible for supplying the request and response objects corresponding to those requests made by the client 160 to the portal application 106. Additionally, the portal application 106 is to provide an implementation of the PortletNode interface 645 that uniquely describes the specific portlet on which the various methods are to be invoked.

The "processAction( )" method invokes the processAction phase of the particular portlet specified in a passed Portlet- Node object. The Portlet Container 126 creates the ActionRequest and the ActionResponse objects using passed HttpServletRequest and HttpServletResponse objects. Additionally, the method sets the appropriate request parameters and invokes the processAction method of the portlet defined by the PortletNode object.

The "render( )" method invokes the render method of the portlet specified in the given PortletNode object. The Portlet Container 126 creates the RenderRequest and the RenderResponse objects using the passed HttpServletRequest and HttpServletResponse objects. The method sets the render request parameters and invokes the render method of the portlet defined by the PortletNode object.

The "serveResource( )" method invokes the serveResource method of the portlet specified in the given PortletNode object. The Portlet Container 126 creates ResourceRequest and the ResourceResponse objects using the passed HttpServletRequest and HttpServletResponse objects.

The "processEvent( )" method invokes the processEvent method of the portlet specified in the given PortletNode object. The Portlet Container 126 creates the EventRequest and the EventResponse objects using the passed HttpServletRequest and HttpServletResponse objects. The method sets the Event to be processed in the EventRequest object and invokes the processEvent method of the portlet defined by the PortletNode object.

The PortletAdmin interface 615 of the PortletContainer API 118 allows the portal application 106 to retrieve and receive information regarding deployed portlets and portlet applications during the portlet administration phase of the portal application 106 design and modifications. Using the PortletAdmin interface 615, administrators can construct a full tree with all portlets deployed on the server in a hierarchical manner, such as "vendor/application name/module name/portlet." The PortletAdmin interface 615 also provide methods to allow and implement wiring between portlets on the portal page 190 as described in JSR 286. The portlet application may be able to retrieve and receive information regarding the events the portlet has declared to publish and accept. Similar functionality is also provided for the public render parameters.

The PortletAdmin interface 615 includes at least a subset of the following methods: "getVendors( )" "getPortletApplicationNames( )" "getPortletModuleNames( )" "getAllPortlets( )" "getPortletPreferences( )" "getExpirationCache( )" "getExpirationCache Scope( )" "getSupportedModes( )" "getPublicRenderParameterNames( )" "getPublicRenderParameterType( )" "getPublishingEventQNames( )" "getProcessingEventQNames( )" "getEvent( )" and "getContainerRuntimeOptions( )".

The "getVendors( )" method returns a list of all vendor names of the applications that contain portlet modules. The "getPortletApplicationNames( )" method returns a list of J2EE applications that contain portlet web modules.

The "getPortletModuleNames( )" method returns a list of all portlet-web-module names which belong to the specified portlet-J2EE-application. If the portlet application name is the full application name (i.e., "vendor"/"application name"), then the portlet-web-module's names corresponding to this application name and vendor will be returned. If only the portlet application name (without the vendor information) is specified and there are deployed applications with one and the same application name, but with different vendors, then an IllegalStateException will be thrown, or else the portlet-web-module's names corresponding to the specified portlet application name will be returned.

The "getAllPortlets( )" method returns a list of all portlets in a specified portlet-web-module. The "getPortletPreferences( )" method returns a new object of a specified portlet's initial preferences as loaded from the specified portlet's deployment descriptor.

The "getExpirationCache( )" method returns the expiration cache timeout value defined in a particular portlet's deployment descriptor. If the expiration cache timeout value returned for a particular portlet is 0 (zero), then caching is determined to be disabled for that particular portlet. If the expiration cache timeout value returned is −1 (negative one), then the cache for that portlet does not expire. If the value returned is "null," then the portlet does not have a defined expiration cache.

The "getExpirationCacheScope( )" method returns the caching scope of the particular portlet as defined in the particular portlet's deployment descriptor. The values returned by the methods are the values defined for the CACHE SCOPE constant defined in the MimeResponse interface. If no scope is provided in the deployment descriptor for the particular portlet, then the method will return PRIVATE_SCOPE as the default cache scope.

The "getSupportedModes( )" method constructs a new java.util.Map object of mapped mime-types to arrays of PortletMode objects as declared in a particular portlet's deployment descriptor's <supports> elements. The map will not include the VIEW mode if it is not declared in the deployment descriptor. If there are no supported types declared for a particular mime type, that mime type's value in the map is an array with a length of 0.

The "getPublicRenderParameterNames( )" method returns identifiers of the public render parameters supported by a particular portlet as an enumeration of string objects, or an empty enumeration if the particular portlet has not defined public render parameters. Public render parameters are generally defined in the particular portlet's deployment descriptor with the supported-public-render-parameter element.

The "getPublicRenderParameterType( )" method returns a detailed type description for a specified public render parameter, including at least a subset of a description, an identifier, a QName, and an alias. Specifically, the method returns a PublicRenderParameterType object that fully describes the public render parameter.

The "getPublishingEventQNames( )" method returns the QNames of the publishing events supported by a particular portlet as an enumeration of QName objects, or an empty enumeration if the portlet has not defined any publishing event. Publishing events are defined in the portlet deployment descriptor with the supported-publishing-event element.

The "getProcessingEventQNames( )" method returns the QNames of the processing events supported by a particular portlet as an enumeration of QName objects, or an empty enumeration if the portlet has not defined any processing events. Processing events are defined in the portlet deployment descriptor with the supported-processing-event element.

The "getEvent( )" method returns an Event object with a specified QName specified with the method's call.

The "getContainerRuntimeOptions( )" method returns the container runtime options and values for a particular portlet. The portlet can set container runtime options in the portlet.xml via the container-runtime-option element with a name and a value on the application and portlet level. If a container runtime option is set on the portal application level and on the portlet level with the same name, the setting on the portlet level takes precedence and overwrites the option set on the portal application level. Further, this method returns a map providing the subset of runtime options that the Portlet Container 126 supports of the options the portlet has specified in the portlet.xml. Options that the Portlet Container 126 does not support will not be included in the returned map. The map will contain the name of the runtime option as a key of type String and the runtime options as values of the type String array (String[ ]) with the values specified in the portlet.xml deployment descriptor.

As previously described, the PortletContainer SPI 122 is a collection of interfaces that the portal application 106, or another user of the Portlet Container 126, implements in order to allow the Portlet Container 126 to receive and share information about invoked portlets and other portal-related information. The PortletContainer SPI 122 includes and makes available multiple services, each available through the implementation of the PortletContainer SPI 122. The SPI 122 includes the following interfaces: the PortletNode interface 645, the CoordinationService interface 650, the CachingService 655, the PortletPreferenceService interface 660, and the PortletURLProviderService 665.

The first interface included in the PortletContainer SPI 122 is the PortletNode interface 645. The PortletNode interface 645 provides additional information for the invoked portlet that is related to the portal application 106 runtime environment. A number of methods are included with the interface, including at least a subset of the following: "getPortletApplicationName( )," "getPortletName( )," "getWindowState( )," "setWindowState( )," "isWindowStateAllowed( )," "getPortletMode( )," "setPortletMode( )," "isPortletModeAllowed( )," "setNextPossiblePortletModes( )," "getPrivateRenderParameters( )," "getRequestParameters( )," "getContextName( )," "setProperty( )," "addProperty( )," "setPrivateRenderParameters( )," "getPortalContext( )," "getUser( )," "setPortletTitle( )," "addCookie( )," "getCookies( )," "getPortletPreferencesService( )," "getPortletURLProviderService( )," "getCoordinationService( )," "getCachingService( )," "getCacheability( )," and "getResourceID( ),".

The "getPortletApplicationName( )" method returns the name of an application, part of which is the present portlet. The "getPortletName( )" method returns the name of the current portlet. The "getWindowState( )" method returns the current Window State of the current portlet. The "setWindowState( )" method updates the Window State of the current portlet as defined in the method call. The "isWindowStateAllowed( )" checks whether the current user is allowed to switch to a particular state.

The "getPortletMode( )" method returns the current portlet mode of the current portlet. The "setPortletMode( )" method updates the portlet mode of the current portlet. The "isPortletModeAllowed( )" method checks whether the current user is allowed to switch to the specified mode. The "setNextPossiblePortletModes( )" method allows the Portlet Container 126 to tell the portal application 106 the next possible portlet modes that make sense from the portlet point of view. If set, the portal application 106 should honor the enumeration of portlet modes and only provide the end user with choices to the provided portlet modes or a subset of these modes based on access control considerations. If the Portlet Container 126 does not set any next possible portlet modes, then the default is that all portlet modes that the portlet has been defined to support in the portlet's deployment descriptor are meaningful and available portlet modes.

The "getPrivateRenderParameters( )" method returns a Map containing all private render parameters. If there are no private render parameters set, then the method returns an empty Map. Private render parameters are only set from the portal application 106 if there is a render request as a result of a render URL to the current portlet. Public render parameters can be obtained from the CoordinationService. The "getRequestParameters( )" returns a merged set of parameters set on the URL (if the call is a result of a portlet URL) and client request parameters. If there is a parameter with the same name in the URL and the client request, then the values set on the URL should precede the values for the client request. The "getContextName( )" method retrieves a unique ID for the portlet, even if the same portlet is included twice in a portal page 190.

The "setProperty( )" method sets a String property for the subsequent render request. This property will be accessible in all subsequent render calls via the PortletRequest.getProperty call until a request is targeted to the portlet. This method is called each time the PortletResponse.setProperty method is called. The "addProperty( )" method adds a String property to an existing key property for the subsequent render request. This property will be accessible in all subsequent render calls via the PortletRequest.getProperty call until a request is targeted to the portlet. This method is called each time the PortletResponse.setProperty method is called.

The "setPrivateRenderParameters( )" method sets a private parameter map for the subsequent render request. As discussed above, private render parameters need only to be set from the portal application 106 if there is a render request as a result of a render URL to the current portlet. Public render parameters should be set in the CoordinationService. The "getPortalContext( )" method retrieves the current portal context. The "getUser( )" method gets the user making the request, and provides read-access to the user's attributes.

The "setPortletTitle( )" method passes a preferred portlet title to be used by the portal application 106 for the title bar. The title from the resource bundle title may be overridden by the portal application 106 or by the portlet. The "addCookie( )" method adds an HTTP cookie via PortletResponse.addProperty (Cookie). The portlet should note that the cookie may not make it to the client, but may instead be stored at or by the portal application 106. The method "getCookies( )" retrieves cookies set by the portlet via PortletResponse.addProperty (Cookie).

The "getPortletPreferencesService( )" returns the Portlet Preferences Service, the "getPortletURLProviderService( )" method returns the PortletURLProviderService, the "getCoordinationService( )" method returns the CoordinationService, and the "getCachingService( )" method returns the CachingService. The "getCacheability( )" method returns the cache level of the resource request. Possible return values are ResourceURL.FULL, ResourceURL.PORTLET, or ResourceURL.PAGE. The "getResourceID( )" returns the resource ID set on the ResourceURL or "null" if no resource ID was set on the URL.

The next interface included in the PortletContainer SPI 122 is the CoordinationService interface 650. The CoordinationService interface 650 provides information about the events and public render parameters to be distributed to the current (or a particular) portlet. The CoordinationService interface 650 includes at least a subset of the following methods: "getPublicParameterMap( )," "getPublicRenderParameter( )," "getPublicRenderParameterValues( )," "setPublicRenderParameter( )," "setRenderParameter( )," "removePublicRenderParameter( )," "getPublicRenderParameterNames( )," "getEvent( )" and "setEvent( )".

The "getPublicParameterMap( )" method returns a map containing all public parameters relevant for this CoordinationService. The "getPublicRenderParameter( )" method returns the value of a parameter specified in the method call. If a value is not set, "null" is returned. If the method is used with a multivalued parameter, the value returned is equal to the first value in the array returned by the "getPublicRenderParameterValues( )" method. The "getPublicRenderParameterValues( )" method returns an array of String objects containing all of the values the given render parameter has, or "null" if the parameter does not exist. If the parameter has a single value, the array has a length of 1.

The "setPublicRenderParameter( )" method sets the value of a public render parameter with an identified parameter ID provided in the method call with a particular value also provided in the call. The "setRenderParameter( )" method sets a String array parameter for the subsequent render request. These parameters are accessible in all subsequent render calls via the PortletRequest.getParameter call until a request is targeted to the portlet. This method is called each time the ActionResponse.setRenderParameter method is called. The "removePublicRenderParameter( )" method removes a specified public render parameter. The "getPublicRenderParameterNames( )" method returns Enumeration of identifiers of public render parameters relevant for this CoordinationService. The "getEvent( )" method returns the current event and removes it from the CoordinationService. If there is no event set, Null is returned. The "setEvent( )" method adds a specified event to the already existing events.

The next interface included in the PortletContainer SPI 122 is the CachingService interface 655. The JSR 286 defines an expiration-based caching mechanism applied to each portlet, and also introduces cache scopes. In other words, cached content is not shared across different clients displaying the same portlet for "private" cache scopes. The CachingService is responsible for managing the expiration cache and the client cache.

A portlet can specify that it wants its content to be cached in the expiration-cache element of its deployment descriptor. If the element is missing, the Portlet Container 126 will treat each portlet as always expired, causing the portlet to regenerate its content when a request is received. The portlet can also specify its cache scope as "public" or "private," indicating whether its content can be shared across users or not. The default value for cache scope is "private." In order to maintain the proper cache, the Portlet Container 126 propagates the expiration cache and the cache scope settings to the portal application 106 via the CachingService. The service is available for the Portlet Container 126 via the PortletNode interface. By providing this information to the portal application 106, the portal application 106 can determine whether or not to cache the content of a particular portlet. If content is cached and not expired, and the portlet is not a target of an action or event request, the portal application 106 may decide not to re-invoke the portlet, instead using the cached content to populate the portal page 190. In some instances, the cached content should be discarded when a processAction( ) or processEvent( ) method is directed toward the portlet.

Additionally, validation-based caching allows the portlet to return a validation token with the response content and an expiration time. The portlet sets the validation token via the ETag property on the RenderResponse and ResourceResponse or via the CacheControl.setETag( ) method. These values can be communicated back to the portal application 106 via the CachingService.

The portal application 106 sends a render or serveResource request to the portlet with the validation cache after the content is expired. The token is provided to the portlet via the ETag property of the RenderRequest or ResourceRequest. The Portlet Container 126 delivers this property to the portlet via the CachingService's getETag( ) method. If the portlet determines that the ETag is still valid, the portlet will not generate new content and can notify the Portlet Container 126 and thus the portal application 106 by setting the USE_CACHED_CONTENT of the RenderResponse and ResourceResponse with a new time, or via setUseCachedContent on the CachedControl object of the RenderResponse and ResourceResponse and set a new expire time.

The CachingService interface 655 provides services for managing the expiration cache of the portal application 106 and the client cache of a portlet. The CachingService interface 655 includes at least a subset of the following methods: "setETag( )," "getETag( )," "setUseCachedContent( )," "setExpirationCache( )," and "setCacheScope( )".

The "setETag( )" method is invoked by the Portlet Container 126 when the portlet invokes the CacheControl.setETag( )method. The "getETag( )" method returns the validation tag for a particular ETag if the portal application 106 has a cached response for the particular ETag, or null if no cached response exists. The "setUseCachedContent( )" method sets the indication of whether the cached content for the provided ETag at the request is still valid or not. If set to true, no output will be generated by the portlet and a new expiration time is set for the markup with the given ETag. The "setExpirationCache( )" method sets a particular expiration cache timeout for the cached content associated with the ETag and overwrites the expiration cache timeout value defined in the associated portlet's deployment descriptor. When the expiration cache timeout value is changed, the portal application 106 is notified. If the specified expiration value is set to 0 (zero), then caching will be disabled for the associated portlet. If the value is set to −1 (negative one), then the cache does not expire. If the value is set to null, then the portlet has not defined an expiration cache. The "setCacheScope( )" passes the cache scope type that the portlet has selected for its cached content.

Another interface included in the PortletContainer SPI 122 is the PortletPreferencesService interface 660. The PortletPreferencesService interface 660 provides services for reading and storing portlet preferences in the server's 102 persistent store (i.e., the set of portal preferences 112). Specifically, the PortletPreferencesService provides a method for retrieving portlet preferences from the persistent store, the portlet preferences containing user-specific properties set in addition to the preferences defined with the portlet's deployment descriptor. The PortletPreferencesService interface 660 includes at least a "getPortletPreferences( )" method, which retrieves the user-specific portlet preference set.

The PortletContainer SPI 122 further includes the PortletURLProviderService interface 665. A portlet often needs to create URLs as part of its content that references the portlet itself. The PortletContainer API 118 defines a PortletConsumerURL interface 620, which includes the specifications PortletURL 635 and ResourceURL 630 interfaces that can be used to create action, render, or resource URLs. However, the URLs generated by the portlet are understandable only in the context of the portal application 106. In the Portlet 2.0 API 130, the usual way of writing the portlet URL in the generated content is to use a "write( )" method instead of the "toString( )" method (used in the Portlet 1.0 API) in order to avoid string object creation. The PortletConsumerURL interface 620 can be inspected for the exact type of the URL by using its getType( ) method. This mechanism adds more URLs by future portlets possible without modifying the current SPI or API packages. If the type of the URL is ACTION or RENDER, the portletConsumerURL parameter can be safely cast down to the PortletURL interface 635. In the case of a RESOURCE type the portletConsumerURL can be cast to the ResourceURL interface 630. Both PortletURL interface 635 and ResourceURL interface 630 provide access to their corresponding attributes. Next to the URL properties and parameters the PortletURL interface 635 also delivers the portlet mode, window state, and public render parameters suitable for the target portlet instance. The getMode( ) method of PortletURL returns values defined by javax.portlet.WindowState (Maximized, Minimized, and Normal). Similarly, ResourceURL returns the cache level of the resource and resource ID.

The PortletURLProviderService interface 665 provides a method for the Portlet Container 126 to create and manipulate portlet URLs. For example, the PortletURLProviderService interface 665 provides methods that allow for a portlet URL to be converted to a string for use in the generated portlet content, as well as methods for writing a particular portlet URL to the output stream of a specified writer. The PortletURLProviderService interface 665 also provides a method of encoding URLs of various resources, such as servlets, JSPs, images, and other static files, at a particular path for use by the portlet and the portal application 106. The PortletURLProviderService interface 665 includes at least a subset of the following methods: "convertPortletURLToString( )," "write( )," and "encodeURL( )."

The "convertPortletURLToString( )" method converts a specified portlet URL to a string value for use in the portlet's render method. The "write( )" method writes the portlet URL to the output stream using a provided writer. The "encodeURL( )" method returns the encoded URL of a particular resource, such as a servlet, JSPs, image, and other static files, at a given path. Portlets should encode all resource URLs pointing to resources in the portlet or portlet application using this method to ensure that the URLs are served via the portal application 106. Some portal/portlet container implementations may require specific URLs to contain certain implementation-specific data encoded therein. The "encodeURL( )" method may include the session ID and other portal/portlet-container specific information into the generated URL. If encoding is not necessary, the method will return the URL unchanged. Portlet developers need be aware that the returned URL after the "encodeURL( )" call may not be a well-formed URL, but instead a special token to be used during content generation by the portlet. Thus, portlets generally should not add additional parameters on the resulting URL or expect to be able to parse the URL.

In some instances, the PortletContainer SPI 122 may include an additional interface, the PortalContextExt interface (not illustrated). The PortalContextExt interface can provide a method for the Portlet Container 126 to retrieve the runtime options supported by the portal application 106. The PortalContextExt interface includes at least a "getSupportedRuntimeOptions( )" method which returns the container runtime options supported by the portal application 106.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A computer-accessible, non-transitory, storage medium encoded with computer-readable instructions configured to cause one or more computers to:

expose an interface to facilitate communication between a portal application and a portlet container during runtime of the portal application,
wherein the portlet container includes the interface and is separate and independent from the portal application,
wherein the interface exposes one or more application programming interfaces (APIs) providing at least one method to permit the portal application to invoke a particular portlet to run within the portlet container,
wherein the interface exposes one or more service provider interfaces (SPIs) providing at least one service to permit the portlet container to obtain information about the particular portlet, and
wherein the interface exposes a web container extension (WCE) API provided by a servlet container permitting the interface to manage a set of web containers associated with a particular web application;
implement the interface during portal application runtime to allow the portal application to execute the particular portlet;
provide a coordination service as part of a communication layer between the portal application and the portlet container, wherein the coordination service coordinates distributed portlet events and public render parameters to entities within the portal application and communication between multiple portlets associated with the portlet container;
generate a first action object and a second action object in response to a received request from the portal application, wherein the received request is to process an action request received by the portal application and the generated first action object and the generated second action object are generated based upon action parameters associated with the received request;
invoke, using the first action object and to run within the portlet container, at least one portlet associated with the action request, wherein the at least one portlet sets at least one render parameter in the second action object;
communicate a portal event between the invoked at least one portlet and another portlet associated with the portal application, wherein the portal event is relayed by the second action object to the coordination service; and
retrieve the at least one render parameter from the second action object to be used in subsequent event and render calls.

2. The medium of claim 1, wherein invoking the at least one portlet comprises invoking a particular phase of the at least one portlet's lifecycle.

3. The medium of claim 2, wherein the phases of the at least one portlet's lifecycle comprise a process action phase, a process event phase, a server resource phase, and a render phase.

4. The medium of claim 1, wherein the provided at least one interface method permits the portal application to perform administrative functions associated with the particular portlet at runtime.

5. The medium of claim 4, the administrative functions associated with the particular portlet comprising retrieving the particular portlet's configuration information included in a deployment descriptor associated with the particular portlet.

6. The medium of claim 1, wherein allowing the portlet container to obtain information about the particular portlet comprises supplying information to the portlet container regarding the portal environment in which the particular portlet is to be invoked.

7. The medium of claim 1, wherein the provided at least one service comprises at least a subset of:

a uniform resource locator (URL) provider service for generating a portal application-specific URL for the particular portlet;

a caching service for communicating the particular portlet's caching management details to the portal application;

a portlet preferences service for reading and storing the particular portlet's preferences; and a portlet node for providing additional information for the particular portlet related to the portal application's runtime environment.

8. The medium of claim 1, wherein the portlet container is compatible with portlets created using both Java Portlet Specification version 1.0 (JSR 168) and Java Portlet Specification version 2.0 (JSR 286).

9. A computerized method, comprising:

exposing an interface to facilitate communication between a portal application and a portlet container during runtime of the portal application,
wherein the portlet container includes the interface and is separate and independent from the portal application,
wherein the interface exposes one or more application programming interfaces (APIs) providing at least one method to permit the portal application to invoke a particular portlet to run within the portlet container,
wherein the interface exposes one or more service provider interfaces (SPIs) providing at least one service to permit the portlet container to obtain information about the particular portlet, and
wherein the interface exposes a web container extension (WCE) API provided by a servlet container permitting the interface to manage a set of web containers associated with a particular web application;

implementing the interface during portal application runtime to allow the portal application to execute the particular portlet;

providing a coordination service as part of a communication layer between the portal application and the portlet container, wherein the coordination service coordinates distributed portlet events and public render parameters to entities within the portal application and communication between multiple portlets associated with the portlet container;

generating a first action object and a second action object in response to a received request from the portal application, wherein the received request is to process an action request received by the portal application and the generated first action object and the generated second action object are generated based upon action parameters associated with the received request;

invoking, using the first action object and to run within the portlet container, at least one portlet associated with the action request, wherein the at least one portlet sets at least one render parameter in the second action object;

communicating a portal event between the invoked at least one portlet and another portlet associated with the portal application, wherein the portal event is relayed by the second action object to the coordination service; and retrieving the at least one render parameter from the second action object to be used in subsequent event and render calls.

10. The computerized method of claim 9, wherein invoking the at least one portlet comprises invoking a particular phase of the at least one portlet's lifecycle.

11. The computerized method of claim 10, wherein the phases of the at least one portlet's lifecycle comprise a process action phase, a process event phase, a server resource phase, and a render phase.

12. The computerized method of claim 9, wherein the provided at least one interface method permits the portal application to perform administrative functions associated with the portlet at runtime via the portlet container.

13. The computerized method of claim 12, the administrative functions associated with the particular portlet comprising retrieving the particular portlet's configuration information included in a deployment descriptor associated with the particular portlet.

14. The computerized method of claim 9, wherein allowing the portlet container to obtain information about the particular portlet comprises supplying information to the portlet container regarding the portal environment in which the particular portlet is to be invoked.

15. The computerized method of claim 9, wherein the provided at least one service comprises at least a subset of:

a uniform resource locator (URL) provider service for generating a portal application-specific URL for the particular portlet;

a caching service for communicating the particular portlet's caching management details to the portal application;

a portlet preferences service for reading and storing the particular portlet's preferences; and a portlet node for providing additional information for the particular portlet related to the portal application's runtime environment.

16. The computerized method of claim 9, wherein the portlet container is compatible with portlets defined using both Java Portlet Specification version 1.0 (JSR 168) and Java Portlet Specification version 2.0 (JSR 286).

17. The computerized method of claim 9, wherein the retrieved at least one render parameter replaces previously set private render parameters.

18. The computerized method of claim 17, wherein private render parameters are set by the portal application upon a render request as a result of a render uniform resource locator (URL) to the at least one portlet.

19. A computer-implemented system comprising:

at least one computer configured to:
expose an interface to facilitate communication between a portal application and a portlet container during runtime of the portal application,
wherein the portlet container includes the interface and is separate and independent from the portal application,
wherein the interface exposes one or more application programming interfaces (APIs) providing at least one method to permit the portal application to invoke a particular portlet to run within the portlet container,
wherein the interface exposes one or more service provider interfaces (SPIs) providing at least one service to permit the portlet container to obtain information about the particular portlet, and
wherein the interface exposes a web container extension (WCE) API provided by a servlet container permitting the interface to manage a set of web containers associated with a particular web application;

implement the interface during portal application runtime to allow the portal application to execute the particular portlet;

provide a coordination service as part of a communication layer between the portal application and the portlet container, wherein the coordination service coordinates distributed portlet events and public render parameters to entities within the portal application and communication between multiple portlets associated with the portlet container;

generate a first action object and a second action object in response to a received request from the portal application, wherein the received request is to process an action request received by the portal application and the generated first action object and the generated second action object are generated based upon action parameters associated with the received request;

invoke, using the first action object and to run within the portlet container, at least one portlet associated with the action request, wherein the at least one portlet sets at least one render parameter in the second action object;

communicate a portal event between the invoked at least one portlet and another portlet associated with the portal application, wherein the portal event is relayed by the second action object to the coordination service; and retrieve the at least one render parameter from the second action object to be used in subsequent event and render calls.

* * * * *